(12) United States Patent
Shyam et al.

(10) Patent No.: US 12,551,607 B2
(45) Date of Patent: Feb. 17, 2026

(54) SLEEP TRACKING FOR ALARM AND THERAPY MODIFICATIONS

(71) Applicants: BAXTER INTERNATIONAL INC., Deerfield, IL (US); BAXTER HEALTHCARE SA, Glattpark (CH)

(72) Inventors: Vishnu Shyam, Lund (SE); Sven Gustafson, Lund (SE); Mikael Lindhult, Lund (SE); Per-Olof Borgqvist, Lund (SE); Peter Drennan, Malmo (SE); Mattias Holmer, Lund (SE); Jeshrene Enerio, Glenview, IL (US); Elizabeth Ashley Mensing, Mt. Prospect, IL (US); Shawn Collin Oppegard, Fox River Grove, IL (US); Nicole Alexandra Chen, Long Grove, IL (US); Arvind Mishra, Buffalo Grove, IL (US); Anders Wellings, Belleair Beach, FL (US); Leah Swanson, McHenry, IL (US); Richard Zanni, Strythers, OH (US); Joan Angela Cianciolo, Cape Coral, FL (US); Jorge Augusto Del Castillo, Des Plaines, IL (US); Matthew Muller, Lindenhurst, IL (US); Bhavesh Padmani, Hawthorn Woods, IL (US)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 582 days.

(21) Appl. No.: 17/985,509

(22) Filed: Nov. 11, 2022

(65) Prior Publication Data
US 2023/0154305 A1    May 18, 2023

Related U.S. Application Data

(60) Provisional application No. 63/315,120, filed on Mar. 1, 2022, provisional application No. 63/279,304, filed on Nov. 15, 2021.

(51) Int. Cl.
*A61M 1/28* (2006.01)
*A61B 5/00* (2006.01)
(Continued)

(52) U.S. Cl.
CPC ............... *A61M 1/28* (2013.01); *A61B 5/165* (2013.01); *A61B 5/4809* (2013.01);
(Continued)

(58) Field of Classification Search
CPC ..... A61B 5/165; A61B 5/4809; A61B 5/4812; A61B 5/4839; A61B 5/7275; A61B 5/746;
(Continued)

(56) References Cited

U.S. PATENT DOCUMENTS

2005/0154330 A1    7/2005 Loree, IV
2010/0010423 A1    1/2010 Yu et al.
(Continued)

FOREIGN PATENT DOCUMENTS

DE          102019128847 A1    4/2021

OTHER PUBLICATIONS

Kumari S Krishna et al: "Blood Sugar Level Indication Through Chewing and Swallowing from Acoustic MEMS Sensor and Deep Learning Algorithm for Diabetic Management", Journal of Medical Systems, Springer US, New York, vol. 43, No. 1, Nov. 15, 2018 (Nov. 15, 2018), pp. 1-9, XP036641281, ISSN: 0148-5598, DOI: 10.1007/S10916-018-1115-2.
(Continued)

*Primary Examiner* — John Kim
(74) *Attorney, Agent, or Firm* — K&L Gates LLP

(57) ABSTRACT

A peritoneal dialysis system includes a control unit configured to (i) store a sleep state pattern for the patient, (ii) begin a patient drain followed by a patient fill when at least one sensor indicates that the patient is in a deep sleep state, (iii)
(Continued)

extend a dwell period if the sleep state pattern indicates that the patient will enter a subsequent deep sleep state within a first time duration after a programmed dwell period, and (iv) shorten the dwell period if the sleep state pattern indicates that the patient will leave the deep sleep state within a second time duration after an end of the programmed dwell period. The system alternatively or additionally assesses or records a stress level of and/or a fluid/caloric intake by the patient and takes actions accordingly.

16 Claims, 11 Drawing Sheets

(51) Int. Cl.
*A61B 5/16* (2006.01)
*A61M 1/16* (2006.01)
*G08B 21/18* (2006.01)
*G16H 20/17* (2018.01)
*G16H 20/40* (2018.01)
*G16H 20/70* (2018.01)
*G16H 40/63* (2018.01)
*G16H 50/20* (2018.01)
*G16H 50/50* (2018.01)

(52) U.S. Cl.
CPC .......... *A61B 5/4812* (2013.01); *A61B 5/4839* (2013.01); *A61B 5/7275* (2013.01); *A61B 5/746* (2013.01); *A61M 1/1601* (2014.02); *A61M 1/1613* (2014.02); *A61M 1/282* (2014.02); *G08B 21/18* (2013.01); *G16H 20/17* (2018.01); *G16H 20/40* (2018.01); *G16H 20/70* (2018.01); *G16H 40/63* (2018.01); *G16H 50/20* (2018.01); *G16H 50/50* (2018.01); *A61M 2205/18* (2013.01); *A61M 2205/33* (2013.01); *A61M 2205/3303* (2013.01); *A61M 2205/3344* (2013.01); *A61M 2205/3375* (2013.01); *A61M 2205/3576* (2013.01); *A61M 2205/42* (2013.01); *A61M 2205/502* (2013.01); *A61M 2205/52* (2013.01); *A61M 2230/005* (2013.01); *A61M 2230/08* (2013.01); *A61M 2230/10* (2013.01); *A61M 2230/201* (2013.01)

(58) Field of Classification Search
CPC ........ G08B 21/18; G16H 20/17; G16H 20/40; G16H 20/70; G16H 40/63; G16H 50/20; G16H 50/50; A61M 1/1601; A61M 1/1613; A61M 1/28; A61M 1/282; A61M 2205/18; A61M 2205/33; A61M 2205/3303; A61M 2205/3344; A61M 2205/3375; A61M 2205/3576; A61M 2205/42; A61M 2205/502; A61M 2205/52; A61M 2230/005; A61M 2230/08; A61M 2230/10; A61M 2230/201
See application file for complete search history.

(56) References Cited

U.S. PATENT DOCUMENTS

2015/0297140 A1  10/2015  Hernandez et al.
2021/0038148 A1  2/2021  Schmidt et al.

OTHER PUBLICATIONS

Huang Hsiang-Yun et al: "Fluid Intake Monitoring System Using a Wearable Inertial Sensor for Fluid Intake Management", Sensors, vol. 20, No. 22, Jan. 1, 2020 (Jan. 1, 2020), pp. 1-17, XP055969191, DOI: 10.3390/s20226682.

International Search Report and Written Opinion of the International Searching Authority for International Application No. PCT / US2022/079723 dated Apr. 28, 2023.

International Preliminary Report on Patentability from International Patent Application No. PCT/US2022/079717, mailed May 30, 2024. 14 pages.

International Preliminary Report on Patentability from International Patent Application No. PCT/US2022/079719, mailed May 30, 2024. 8 pages.

International Preliminary Report on Patentability from International Patent Application No. PCT/US2022/079723, mailed May 30, 2024. 12 pages.

SLEEP TRACKING FOR ALARM AND THERAPY MODIFICATIONS

PRIORITY CLAIM AND CROSS-REFERENCE TO RELATED APPLICATIONS

This application claims priority to and the benefit of U.S. Provisional Patent App. No. 63/279,304 filed Nov. 15, 2021, titled PERITONEAL DIALYSIS PATIENT FEEDBACK SYSTEMS AND METHODS, and U.S. Provisional Patent App. No. 63/315,120 filed Mar. 1, 2022, titled PERITONEAL DIALYSIS PATIENT FEEDBACK SYSTEMS AND METHODS, the entire contents of which are incorporated by reference herein in their entirety.

BACKGROUND

The present disclosure relates generally to medical fluid treatments and in particular to dialysis fluid treatments.

Due to various causes, a person's renal system can fail. Renal failure produces several physiological derangements. It is no longer possible to balance water and minerals or to excrete daily metabolic load. Toxic end products of metabolism, such as, urea, creatinine, uric acid and others, may accumulate in a patient's blood and tissue.

Reduced kidney function and, above all, kidney failure is treated with dialysis. Dialysis removes waste, toxins and excess water from the body that normal functioning kidneys would otherwise remove. Dialysis treatment for replacement of kidney functions is critical to many people because the treatment is lifesaving.

One type of kidney failure therapy is Hemodialysis ("HD"), which in general uses diffusion to remove waste products from a patient's blood. A diffusive gradient occurs across the semi-permeable dialyzer between the blood and an electrolyte solution called dialysate or dialysis fluid to cause diffusion.

Hemofiltration ("HF") is an alternative renal replacement therapy that relies on a convective transport of toxins from the patient's blood. HF is accomplished by adding substitution or replacement fluid to the extracorporeal circuit during treatment. The substitution fluid and the fluid accumulated by the patient in between treatments is ultrafiltered over the course of the HF treatment, providing a convective transport mechanism that is particularly beneficial in removing middle and large molecules.

Hemodiafiltration ("HDF") is a treatment modality that combines convective and diffusive clearances. HDF uses dialysis fluid flowing through a dialyzer, similar to standard hemodialysis, to provide diffusive clearance. In addition, substitution solution is provided directly to the extracorporeal circuit, providing convective clearance.

Most HD, HF, and HDF treatments occur in centers. A trend towards home hemodialysis ("HHD") exists today in part because HHD can be performed daily, offering therapeutic benefits over in-center hemodialysis treatments, which occur typically bi- or tri-weekly. Studies have shown that more frequent treatments remove more toxins and waste products and render less interdialytic fluid overload than a patient receiving less frequent but perhaps longer treatments. A patient receiving more frequent treatments does not experience as much of a down cycle (swings in fluids and toxins) as does an in-center patient, who has built-up two or three days' worth of toxins prior to a treatment. In certain areas, the closest dialysis center can be many miles from the patient's home, causing door-to-door treatment time to consume a large portion of the day. Treatments in centers close to the patient's home may also consume a large portion of the patient's day. HHD can take place overnight or during the day while the patient relaxes, works or is otherwise productive.

Another type of kidney failure therapy is peritoneal dialysis ("PD"), which infuses a dialysis solution, also called dialysis fluid, into a patient's peritoneal chamber via a catheter. The dialysis fluid is in contact with the peritoneal membrane in the patient's peritoneal chamber. Waste, toxins and excess water pass from the patient's bloodstream, through the capillaries in the peritoneal membrane, and into the dialysis fluid due to diffusion and osmosis, i.e., an osmotic gradient occurs across the membrane. An osmotic agent in the PD fluid provides the osmotic gradient. Used or spent dialysis fluid is drained from the patient, removing waste, toxins and excess water from the patient. This cycle is repeated, e.g., multiple times.

There are various types of peritoneal dialysis therapies, including continuous ambulatory peritoneal dialysis ("CAPD"), automated peritoneal dialysis ("APD"), tidal flow dialysis and continuous flow peritoneal dialysis ("CFPD"). CAPD is a manual dialysis treatment. Here, the patient manually connects an implanted catheter to a drain to allow used or spent dialysis fluid to drain from the peritoneal chamber. The patient then switches fluid communication so that the patient catheter communicates with a bag of fresh dialysis fluid to infuse the fresh dialysis fluid through the catheter and into the patient. The patient disconnects the catheter from the fresh dialysis fluid bag and allows the dialysis fluid to dwell within the peritoneal chamber, wherein the transfer of waste, toxins and excess water takes place. After a dwell period, the patient repeats the manual dialysis procedure, for example, four times per day. Manual peritoneal dialysis requires a significant amount of time and effort from the patient, leaving ample room for improvement.

Automated peritoneal dialysis ("APD") is similar to CAPD in that the dialysis treatment includes drain, fill and dwell cycles. APD machines, however, perform the cycles automatically, typically while the patient sleeps. APD machines free patients from having to manually perform the treatment cycles and from having to transport supplies during the day. APD machines connect fluidly to an implanted catheter, to a source or bag of fresh dialysis fluid and to a fluid drain. APD machines pump fresh dialysis fluid from a dialysis fluid source, through the catheter and into the patient's peritoneal chamber. APD machines also allow for the dialysis fluid to dwell within the chamber and for the transfer of waste, toxins and excess water to take place. The source may include multiple liters of dialysis fluid including several solution bags.

APD machines pump used or spent dialysate from the patient's peritoneal cavity, though the catheter, and to the drain. As with the manual process, several drain, fill and dwell cycles occur during dialysis. A "last fill" may occur at the end of the APD treatment. The last fill fluid may remain in the peritoneal chamber of the patient until the start of the next treatment, or may be manually emptied at some point during the day.

APD patients in many cases receive treatment according to a doctor's or clinician's treatment prescription. The treatment prescription sets forth treatment parameters that instruct the PD machine how to run, and specify which type or types of PD fluids to use. The patient may have some input into the details of the prescription. For example, US Patent Publication No. 2010/0010423 ("the '423 Publication), assigned to the assignee of the present disclosure, discloses taking into account patient preferences in developing a treatment prescription, wherein the patient preferences as disclosed at paragraphs [0122] and [0123] may involve (i) how much ultrafiltration ("UF") to remove based how much the patient expects to consume on a given day, (ii) the total length of treatment based on how much time the patient has to sleep on a particular night, or (iii) the patient's expected perspiration level on a given day. While the '423 Publication allows for certain patient preferences, there is an additional need to take into account patient information in developing patient prescriptions and in modifying APD treatments over time to better tailor the prescriptions to the patient's lifestyle.

An improved an APD system is needed accordingly.

SUMMARY

The present disclosure sets forth multiple patient factors or parameters that may be taken into account either during an ongoing automated peritoneal dialysis ("APD") treatment or for use in modifying or specifying an upcoming APD treatment. The factors or parameters include patient stress, patient fluid/caloric intake and the patient's sleep patterns. The system of the present disclosure may include or take into account any one or more or all three factors or parameters.

In one embodiment, the peritoneal dialysis ("PD") system measures and analyzes the patient's stress level. The system includes a PD machine or cycler, which interfaces with a number of patient stress sensors and uses an algorithm that analyzes output data from the sensors to determine a stress level index for the patient.

The sensors may be provided at the machine and/or worn by the patient. Machine side sensors may include an integrated camera and/or a microphone. The PD cycler may itself or with the help of cloud/mobile network software analyze stress pattern facial expressions and head movements using outputs from the camera. The output of the camera may also be used to analyze patient eye movement to look for stress patterns. The camera may be further used to look at the patient's body movements to identify stressed-related movements as compared to relaxed body movements. All of such camera data may be compared to known relaxed state images. Sound recordings from the patient via the microphone may be used by the PD machine itself or the cloud/mobile network software to identify known stressed sounds, sound levels and sound patterns.

The patient additionally or alternatively may wear one or more stress sensor(s), such as a blood pressure and/or heart rate sensor, which communicates wirelessly with the PD machine or cycler in one embodiment. Blood pressure and/or heart rate data is analyzed either by the PD machine itself or is sent to the cloud/mobile network software to look for output levels indicating patient stress.

Each of the stress sensor outputs described above may be fed into a stress algorithm stored within the PD machine or at the cloud/mobile network. The algorithm may determine an overall patient stress index. That stress index may then be sent to a doctor's or clinician's computer or smartphone and be used to (i) chart the patient's stress levels, (ii) update a non-stressed patient baseline behavior periodically, and/or (iii) notify the doctor or clinician if the patient's stress level indicates that the patient needs to be contacted and possibly examined and/or that the patient's treatment prescription may need to be modified.

In another embodiment, which may be implemented instead of or in addition to patient stress, the PD system measures and analyzes the patient's fluid/caloric intake and activity level to (i) potentially change the patient's treatment prescription or (ii) use a certain approved treatment prescription instead of another approved treatment prescription. APD in general performs two functions, namely, removes waste and toxins from the patient's body and removes excess liquid from the patient. Both functions can depend on how much food and liquid that the patient has ingested prior to treatment. The patient's activity level may also affect how much liquid the patient loses via perspiration. Lowering food and liquid intake and increasing sweat producing activities may allow for the PD treatment to use a lower glucose level dialysis fluid and/or for treatment times to be reduced. Conversely, the patient may need a higher level glucose fluid, longer dwell times and perhaps more APD cycles if the patient consumes larger amounts of calories and liquids, while remaining generally inactive.

The system in taking into account fluid/caloric intake again includes a PD machine or cycler that interfaces with a wearable sensor. The sensor may include any one or more of a microphone having audio filters to listen for eating and drinking sounds, a motion sensor (e.g., accelerometer or strain gauge) to detect a drinking hand movement, or a timer to detect how long an eating or drinking activity lasts. The system may also include a speaker at the PD machine, and/or a visual alert at the patient's smart device to alert the patient if approaching an intake limit. The system may still further include a patient blood sugar sensor or monitor. A profile output of the blood sugar sensor or monitor is monitored in one embodiment to indicate what kind of food and/or beverage is being consumed by the patient. For example, a fast response or change in the output from the blood sugar sensor or monitor indicates that the patient has consumed fast carbohydrates or sugars. A slow response or change in the output from the blood sugar sensor or monitor indicates that the patient has consumed a more protein or vegetable-based meal.

The wearable sensor may also interface with the patient's smart device, e.g., smartphone. The PD machine or cycler may in addition interface with cloud/mobile network software, wherein the cycler or the cloud/mobile network software may analyze the fluid/caloric intake data and make recommendations if needed, e.g., to choose one approved treatment prescription versus another approved treatment prescription. The cloud/mobile network software may also interface with the doctor's or clinician's computer and possibly the clinician's smart device. Here, the doctor or clinician may analyze the patient's fluid/caloric intake over time, e.g., via a trend or graph generated at the doctor/clinician's computer and/or their smart device and update the patient's treatment prescription(s) if needed or desirable.

In one example of the fluid/caloric intake system, the wireless wearable automatically calculates the fluid intake using audio samples from the microphone, movement sensor and software algorithm. During treatment setup, the patient may be asked to drink water from a reference volume glass so that the wearable software learns the patient's fluid intake pattern using the audio samples, hand movements and reference glass volume. The wireless wearable also computes the patient's physical activity using hand movement and heart pulse rate. Diet information may be obtained from a mobile application on the patient's smart device. Food and fluid intake may alternatively or additionally also be entered or confirmed manually via the mobile application or perhaps at the PD machine or cycler. The PD cycler may communicate with the patient's wireless wearable when within a communication vicinity, e.g., via Bluetooth or WiFi, to retrieve dietary information from the wearable sensor. The PD cycler, the smart device and/or the cloud/mobile network or server software may analyze the fluid/caloric activity information and recommend to the doctor or clinician to change the patient's treatment prescription if the current treatment prescription is not sufficient, or is too stringent, based on the received and analyzed data. The PD cycler, the patient's smart device and/or the doctor or clinician may also advise the patient about fluid intake and diet.

In a third embodiment, which may be implemented instead of or in addition to one or both of the patient stress and fluid/caloric intake embodiments, the PD system measures and analyzes the patient's sleep patterns during nighttime APD treatment (which are typical) to potentially alter the timing of certain machine functions with the goal of helping the patient get a good night's sleep. The sleep system generally involves sleep sensing, learning, applying what has been learned to further sensing, and applying the learned sleep patterns to ongoing treatments and treatment prescriptions. The sleep sensing system includes placing sensors located either at the PD machine or cycler, on the patient (e.g., a wearable sensor), or on a peripheral device (portable, e.g., smart device) that records physiological signals correlated to the patient's sleep state. The sensed signals may include any one or more of blood pressure, heart rate, respiratory rate, oxygenation level, temperature, movement and combinations of same.

The learning or artificial intelligence ("AI") aspect of the sleep system involves the use of sensed data to learn and update the patient's sleeping patterns and sleep states (e.g., deep sleep, rapid eye movement ("REM"), and awake). After the patient's sleep patterns have been learned, the PD machine or cycler may be modified as to (i) how PD fluid pumping (filling or draining) takes place, (ii) how alarms and alerts are delivered, and (iii) whether or not to have the PD machine or cycler play soothing sounds. Each of (i) to (iii) is provided with the goal of minimizing sleep disruption and promoting as healthy a night of sleep as possible. The sensed sleep data may also be transferred to a doctor's or clinician's digital support platform, where the data is analyzed to determine if and how a patient's treatment prescription may be modified to minimize sleep disruption, while still providing the required fluid removal and solute clearance.

One possible optimization technique is to perform patient fills and drains, especially drains, when the patient is out of or coming out of a deep sleep state so as not to disturb the deep sleep state. Another possible optimization technique is to test the patient to determine if draining and filling wakes the patient during a deep sleep state, and if not to perform patient fills and drains during the deep sleep, so that the patient is less likely to be wakened at all due to filling or draining. Here, the control unit of the PD machine may be programmed to use a stored sleep pattern for the patient in combination with at least one sleep state sensor output. The stored sleep pattern provides predictive information, while the sleep state sensor output provides real time information. The control unit in an embodiment uses the real time information to know when the patient has entered a deep sleep state, which has been tested to confirm that it is safe (does not disrupt the deep sleep state) to perform pumping activities, which in most cases involves a patient drain followed by a patient fill. The goal is to complete the patient drain and patient fill while the patient is in a deep sleep state so as not to wake the patient. After the patient drain and patient fill, the control unit then uses the patient's predictive information to know how long to set the dwell period for the latest patient fill. Dwell periods can vary from patient to patient and are optimized often based on the patient's transport characteristics. But there is typically room for varying the dwell time. So if the predictive information reveals that the patient will come out of a deep sleep state during the dwell but enter a new deep sleep state at a time that is a little longer than the patient's optimal dwell time, the control unit of the present system causes the current dwell period to be extended until the real time data from the sleep state sensor indicates that the patient is again in a deep or at least a deeper sleep state. If on the other hand, the predictive information reveals that the patient will come out of a deep sleep state during the next patient drain and fill, then the control unit can shorten the programmed dwell time if needed in an attempt to complete the patient drain and the patient fill prior to the patient beginning to come out of the deep sleep state.

Another possible optimization technique is for the control unit to cause the cycler to not alarm if at all possible during a deep sleep state and to save non-critical alerts or alarms to the morning if safe to do so. It is also contemplated for the PD machine or cycler to play soothing sounds, e.g., rolling waves or thunder, during certain sleep states. The PD machine or cycler may further be linked to cloud/mobile network software and/or a doctor/clinician's patient smart device to upload recorded sleep data for analysis and for developing sleep trends over time, which may be used for artificial intelligence purposes to develop more productive sleep algorithms and treatment prescription modifications, which may be generic or specific to a particular patient.

It is contemplated in one embodiment for a control unit of the PD system to operate with at least one sensor that is configured to detect a sleep state of a patient. The control unit is configured to categorize or know a category of an alarm event. The categorizing or known categories may include a first level or critical alarm event, a second level or intermediate alarm event and a third level or non-threatening alarm event. Additional categories may be provided if needed. The control unit is then further configured to (i) provide an audio alarm for the first level (critical) alarm event during a deep sleep state if the first level alarm event occurs during the deep sleep state, (ii) provide an audio alarm for the second level (intermediate) alarm event during a lighter sleep state if the second level alarm event occurs during the deep sleep state, and (iii) provide an audio alarm for the third level (non-threatening) alarm event after the patient has awakened.

The audio alarm for the first level (critical) alarm event may be an escalating audio alarm that increases in volume as the patient transitions into lighter sleep states. The control unit is configured in one embodiment to provide the audio alarm for the first level (critical) alarm event upon occurrence of the first level (critical) alarm event regardless of which sleep state the first level (critical) alarm event occurs. The control unit may also be configured to provide the audio alarm for the third level alarm event after the patient has awakened regardless of which sleep state the third level alarm event occurs.

It is further contemplated to program the control unit of the PD system operating with at least one sleep sensor to perform a patient sleep optimization in which the cycler performs one or more trial treatment on the patient testing two scenarios (i) adjusting patient dwells so that the patient drains/patient fills occur during deep sleep states and (ii) adjusting patient dwells so that the patient drains/patient fills occur during lighter sleep states. The one or more trial treatment may show that the patient drain/patient fill wakes the particular patient even in a deep sleep state and that it is better overall in subsequent treatments for the cycler to let the patient sleep through deep sleep states and instead perform patient drains/patient fills in lighter sleep states knowing that the patient is likely to be awakened. The results of the trial treatment in (ii) may be used to confirm that the patient feels overall more rested when the patient is undisturbed during deep sleep states and when the patient drains/patient fills occur during lighter sleep states. Conversely, if the one or more trial treatment results indicate that the patient drain/patient fill does not wake the patient in a deep sleep state but does wake the patient in lighter sleep states, then the cycler is set so that in subsequent treatments, the patient dwells are adjusted so that the patient drains/patient fills occur during deep sleep states.

In light of the disclosure set forth herein, and without limiting the disclosure in any way, in a first aspect of the present disclosure, which may be combined with any other aspect, or portion thereof, a peritoneal dialysis ("PD") system includes at least one sensor configured to detect a sleep state of a patient; a PD fluid pump positioned and arranged to pump fresh PD fluid to the patient and remove used PD fluid from the patient; and a control unit for controlling the PD fluid pump, the control unit configured to (i) store a sleep state pattern for the patient, (ii) begin a patient drain followed by a patient fill when the at least one sensor indicates that the patient is in a deep sleep state, (iii) extend a programmed dwell period if the sleep state pattern indicates that the patient will enter a subsequent deep sleep state within a first time duration after the programmed dwell period, and (iv) shorten the programmed dwell period if the sleep state pattern indicates that the patient will leave the deep sleep state within a second time duration after an end of the programmed dwell period.

In a second aspect of the present disclosure, which may be combined with any other aspect, or portion thereof, the programmed dwell period corresponds to an optimal dwell period for the patient.

In a third aspect of the present disclosure, which may be combined with any other aspect, or portion thereof, the first time duration is based on a maximum dwell period within which transport continues to occur across the patient's peritoneal membrane into the patient's peritoneal cavity.

In a fourth aspect of the present disclosure, which may be combined with any other aspect, or portion thereof, the second time duration is based on an expected amount of time needed for the patient drain followed by the patient fill.

In a fifth aspect of the present disclosure, which may be combined with any other aspect, or portion thereof, the at least one sensor includes a wearable sensor.

In a sixth aspect of the present disclosure, which may be combined with any other aspect, or portion thereof, the at least one sensor is provided by a PD machine, the PD machine including the PD fluid pump and the control unit.

In a seventh aspect of the present disclosure, which may be combined with any other aspect, or portion thereof, the at least one sensor is provided by a patient smart device.

In an eighth aspect of the present disclosure, which may be combined with any other aspect, or portion thereof, the at least one sensor includes at least one of a blood pressure sensor, a heart rate sensor, a respiratory rate sensor, an oxygen level sensor, a temperature sensor, a movement sensor and combinations of same.

In a ninth aspect of the present disclosure, which may be combined with any other aspect, or portion thereof, the control unit is further configured to hold at least one alarm or alert until an end of a PD treatment including the patient drain followed by the patient fill.

In a tenth aspect of the present disclosure, which may be combined with any other aspect, or portion thereof, the control unit is further configured to cause a soothing sound to be played during at least one of the deep sleep state or the subsequent deep sleep state.

In an eleventh aspect of the present disclosure, which may be combined with any other aspect, or portion thereof, a PD system comprises at least one sensor configured to detect a sleep state of a patient; a PD fluid pump positioned and arranged to pump fresh PD fluid to the patient and remove used PD fluid from the patient; and a control unit for controlling the PD fluid pump, the control unit configured to (i) store a sleep state pattern for the patient, (ii) begin a patient drain followed by a patient fill when the at least one sensor indicates that the patient is in a deep sleep state, (iii) extend a programmed dwell period if the sleep state pattern indicates that the patient will enter a subsequent deep sleep state within a time duration after a programmed dwell period, wherein the time duration is based on a maximum dwell period within which transport continues to occur across the patient's peritoneal membrane into the patient's peritoneal cavity.

In a twelfth aspect of the present disclosure, which may be combined with any other aspect, or portion thereof, the time duration is a first time duration, and wherein the control unit is further configured to (iv) shorten the programmed dwell period if the sleep state pattern indicates that the patient will leave the deep sleep state within a second time duration after an end of the programmed dwell period.

In a thirteenth aspect of the present disclosure, which may be combined with any other aspect, or portion thereof, the programmed dwell period corresponds to an optimal dwell period for the patient.

In a fourteenth aspect of the present disclosure, which may be combined with any other aspect, or portion thereof, a PD system comprises at least one sensor configured to detect a sleep state of a patient; a PD fluid pump positioned and arranged to pump fresh PD fluid to the patient and remove used PD fluid from the patient; and a control unit for controlling the PD fluid pump, the control unit configured to (i) store a sleep state pattern for the patient, (ii) begin a patient drain followed by a patient fill when the at least one sensor indicates that the patient is in a deep sleep state, and (iii) shorten a programmed dwell period if the sleep state pattern indicates that the patient will leave the deep sleep state within a time duration based on an expected amount of time needed for the patient drain followed by the patient fill.

In a fifteenth aspect of the present disclosure, which may be combined with any other aspect, or portion thereof, the time duration is a first time duration, and wherein the control unit is further configured to (iv) extend the programmed dwell period if the sleep state pattern indicates that the patient will enter a subsequent deep sleep state within a second time duration after the programmed dwell period.

In a sixteenth aspect of the present disclosure, which may be combined with any other aspect, or portion thereof, a PD system comprises at least one sensor configured to detect a sleep state of a patient; a PD fluid pump positioned and arranged to pump fresh PD fluid to the patient and remove used PD fluid from the patient; and a control unit for controlling the PD fluid pump, the control unit configured to delay an audio alarm for an alarm event until the patient's sleep state transitions from a deep sleep state to a lighter sleep state, the control unit configured to provide the audio alarm during the lighter sleep state to wake the patient.

In a seventeenth aspect of the present disclosure, which may be combined with any other aspect, or portion thereof, the control unit is further configured to provide a visual alarm for the alarm event at anytime after the alarm event occurs.

In an eighteenth aspect of the present disclosure, which may be combined with any other aspect, or portion thereof, the control unit is further configured to begin a patient drain followed by a patient fill when the at least one sensor indicates that the patient is in the deep sleep state.

In a nineteenth aspect of the present disclosure, which may be combined with any other aspect, or portion thereof, the alarm event is an intermediate alarm event, the system further including a critical alarm event, and wherein the control unit is configured to provide an audio alarm for the critical alarm event during the deep sleep state if the critical alarm event occurs during the deep sleep state.

In a twentieth aspect of the present disclosure, which may be combined with any other aspect, or portion thereof, the audio alarm for the critical alarm event is an escalating audio alarm.

In a twenty-first aspect of the present disclosure, which may be combined with any other aspect, or portion thereof, the control unit is configured to provide the audio alarm for the intermediate alarm event upon occurrence of the intermediate alarm event if the intermediate alarm event occurs in the lighter sleep state.

In a twenty-second aspect of the present disclosure, which may be combined with any other aspect, or portion thereof, the control unit is configured to provide a visual alarm for the critical alarm event after the critical alarm event occurs.

In a twenty-third aspect of the present disclosure, which may be combined with any other aspect, or portion thereof, the alarm event is an intermediate alarm event, the system further including a non-threatening alarm event, and wherein the control unit is configured to provide an audio alarm for the non-threatening alarm event after the patient has awakened.

In a twenty-fourth aspect of the present disclosure, which may be combined with any other aspect, or portion thereof, the control unit is configured to provide the audio alarm for the non-threatening alarm event after treatment has ended.

In a twenty-fifth aspect of the present disclosure, which may be combined with any other aspect, or portion thereof, the at least one sensor includes a wearable sensor.

In a twenty-sixth aspect of the present disclosure, which may be combined with any other aspect, or portion thereof, the at least one sensor is provided by a PD machine, the PD machine including the PD fluid pump and the control unit.

In a twenty-seventh aspect of the present disclosure, which may be combined with any other aspect, or portion thereof, the at least one sensor is provided by a patient smart device.

In a twenty-eighth aspect of the present disclosure, which may be combined with any other aspect, or portion thereof, the at least one sensor includes at least one of a blood pressure sensor, a heart rate sensor, a respiratory rate sensor, an oxygen level sensor, a temperature sensor, a movement sensor and combinations of same.

In a twenty-ninth aspect of the present disclosure, which may be combined with any other aspect, or portion thereof, a PD system includes at least one sensor configured to detect a sleep state of a patient; a PD fluid pump positioned and arranged to pump fresh PD fluid to the patient and remove used PD fluid from the patient; and a control unit for controlling the PD fluid pump, the control unit configured to categorize or know a category of an alarm event including a first level alarm event, a second level alarm event and a third level alarm event, and wherein the control unit is further configured to (i) provide an audio alarm for the first level alarm event during a deep sleep state if the first level alarm event occurs during the deep sleep state, (ii) provide an audio alarm for the second level alarm event during a lighter sleep state if the second level alarm event occurs during the deep sleep state, and (iii) provide an audio alarm for the third level alarm event after the patient has awakened.

In a thirtieth aspect of the present disclosure, which may be combined with any other aspect, or portion thereof, the audio alarm for the first level alarm event is an escalating audio alarm.

In a thirty-first aspect of the present disclosure, which may be combined with any other aspect, or portion thereof, the control unit is configured in to provide the audio alarm for the first level alarm event upon occurrence of the first level alarm event regardless of which sleep state the first level alarm event occurs.

In a thirty-second aspect of the present disclosure, which may be combined with any other aspect, or portion thereof, the control unit is configured to provide the audio alarm for the third level alarm event after the patient has awakened regardless of which sleep state the third level alarm event occurs.

In a thirty-third aspect of the present disclosure, which may be combined with any other aspect, or portion thereof, a PD system includes at least one sensor configured to detect a sleep state of a patient; a PD fluid pump positioned and arranged to pump fresh PD fluid to the patient and remove used PD fluid from the patient; and a control unit for controlling the PD fluid pump, the control unit configured to test a patient in at least one trial treatment to determine if a patient drain followed by a patient fill wakes the patient from a deep sleep state, as sensed by the at least one sensor, and if so, cause a patient drain followed by a patient fill to begin when the patient is in a lighter sleep state during at least one subsequent treatment.

In a thirty-fourth aspect of the present disclosure, which may be combined with any other aspect, or portion thereof, the control unit is further configured to run at least one trial treatment to confirm that the patient feels more rested when the patient drain followed by the patient fill begins when the patient is in the lighter sleep state.

In a thirty-fifth aspect of the present disclosure, which may be combined with any other aspect, or portion thereof, the control unit is further configured such that if during the at least one trial treatment the patient drain followed by the patient fill does not wake the patient from the deep sleep state, as sensed by the at least one sensor, the patient drain followed by the patient fill during the at least one subsequent treatment is caused to begin when the patient is in a deep sleep state.

In a thirty-sixth aspect of the present disclosure, which may be combined with any other aspect, or portion thereof, any of the features, functionality and alternatives described in connection with any one or more of FIGS. 1 to 11 may be combined with any of the features, functionality and alternatives described in connection with any other of FIGS. 1 to 11.

In light of the above aspects and the disclosure set forth herein, it is accordingly an advantage of the present disclosure to provide an automated peritoneal dialysis ("APD") system that detects PD patient stress levels automatically so that corrective actions may be taken if needed.

It is another advantage of the present disclosure to provide an APD system that tracks or trends PD patient stress levels so that the patient's treatment prescription may be modified if needed, to update the patient's stress profile, and/or to provide the patient counseling if needed.

It is a further advantage of the present disclosure to provide an APD system that detects a PD patient's fluid/caloric intake, e.g., automatically or via patient entry, to recommend or modify a patient treatment prescription for an upcoming treatment.

It is yet another advantage of the present disclosure to provide an APD system that tracks or trends a PD patient's fluid/caloric intake so that treatment prescriptions for the PD patient to use in the future may be modified.

It is yet a further advantage of the present disclosure to provide APD system that tracks or trends a PD patient's fluid/caloric intake so that the patient may be counseled as to diet modification if needed.

It is still another advantage of the present disclosure to provide an APD system that helps to ensure that PD patients get adequate sleep.

It is still a further advantage of the present disclosure to provide an APD system that automatically monitors a patient's sleep state.

Moreover, it is an advantage of the present disclosure to provide an APD system that can modify pumping and valving movements and the provision of alarms based on the PD patient's sleep state and potentially provide soothing sounds that help the PD patient to sleep.

Further still, it is an advantage of the present disclosure to provide an APD system that uses artificial intelligence to update a PD patient's sleep patterns.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

System Including PD Machine or Cycler

Figure 1:
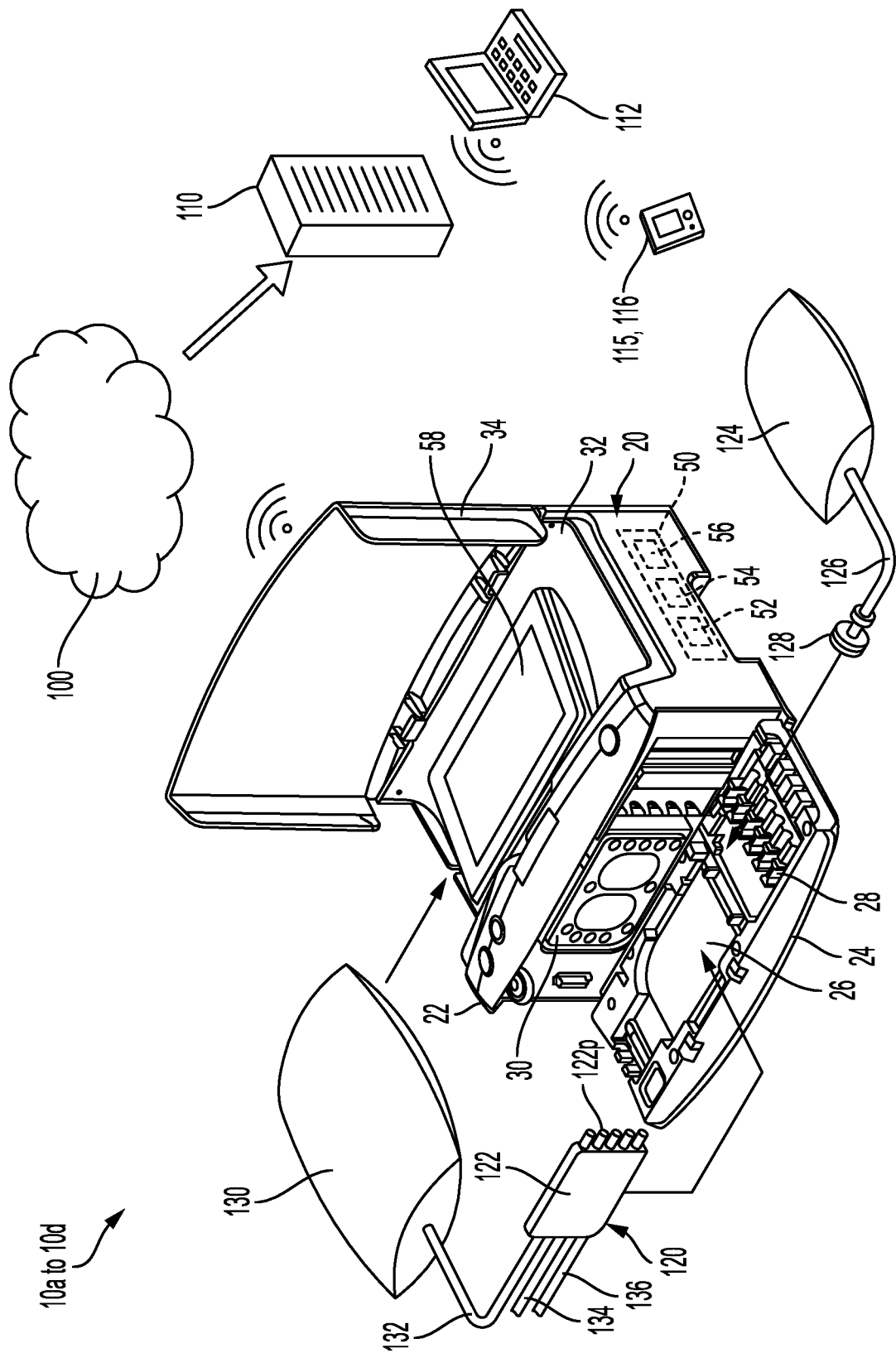
FIG. 1 is a perspective view illustrating one embodiment of a system including a PD machine or cycler, which is suitable for any one or more or all of the patient stress, patient fluid/caloric intake and the patient sleep pattern embodiments discussed herein.

Referring now to the drawings and in particular to FIG. 1, an embodiment of an peritoneal dialysis ("PD") machine or cycler 20 for use in any of systems 10a to 10d discussed herein is illustrated. PD machine or cycler 20 includes a housing 22, which uses pneumatic pumping in one embodiment, and which operates a disposable set 120. All rigid and flexible tubing portions of disposable set 120 may be made of one or more plastic, e.g., polyvinylchloride ("PVC") or a non-PVC material, such as polyethylene ("PE"), polyurethane ("PU") or polycarbonate ("PC"). Housing 22 of PD machine or cycler 20 may be made of any of the above plastics, and/or of metal, e.g., stainless steel, steel and/or aluminum.

In the illustrated embodiment, housing 22 is provided with hinged door 24 having a cassette contacting plate 26 and a PD fluid supply tube receiving section 28. Housing 22 also includes a cassette actuation surface 30 that allows positive and negative pressurized air to close and open pump and valve areas provided by a disposable cassette 122 of disposable set 120. Cassette contacting plate 26 closes disposable cassette 122 against cassette actuation surface 30 during treatment to hold the cassette firmly in place for pneumatic actuation.

One or more PD fluid supply container or bag 124 of disposable set 120 is fluidly communicated with disposable cassette 122 via one or more PD fluid supply tube 126 that extends through PD fluid supply tube receiving section 28 of hinged door 24. In the illustrated embodiment, one or more PD fluid supply tube 126 terminates with a spiked connector 128 that spikes a corresponding port 122p of disposable cassette 122 to establish PD fluid communication between one or more PD fluid supply container or bag 124 and disposable cassette 122.

PD machine or cycler 20 in the illustrated embodiment includes a heating pan 32 for batch heating fresh PD fluid located within a heating container or bag 130 connected to disposable cassette 122 via a heating line 132 and placed on heating pan 32 during setup for treatment. Disposable set 120 also includes a patient line 134 extending from disposable cassette 122 to a patient connector (not illustrated) for connecting to a patient's transfer set, which communicates fluidly with the patient's indwelling PD catheter. Disposable set 120 further includes a drain line 136 extending from disposable cassette 122 to a house drain (e.g., toilet or bathtub) or a drain container or bag (not illustrated).

PD machine or cycler 20 in the illustrated embodiment includes a hinged lid 34 that folds down over heating container or bag 130 during treatment to help thermally insulate that bag. A hinged user interface 58 during storage and non-use of PD machine or cycler 20 folds down beneath hinged lid 34. During treatment, user interface 58 is rotated up for viewing.

PD machine or cycler 20 further includes a control unit 50 having one or more processor 52, one or more memory 54 and a video controller 56, which interfaces one or more processor 52 and one or more memory 54 with a user interface 58. User interface 58 may include a touch screen and/or electromechanical buttons, such as membrane switches for inputting user commands and providing instructions, alerts and alarms. Providing user interface 58 adjacent to door 24 of housing 22 enables the patient or other user to generally interact with one surface of machine 20 for inputting commands, receiving data and loading/unloading disposable cassette 122. User interface 58 may alternatively or additionally be a remote user interface, e.g., implemented on a tablet or smartphone.

Control unit 50 may also include a transceiver and a wired or wireless connection to a network 100, such as a cloud/mobile network accessed via the internet, for sending treatment data to and receiving treatment prescription instructions/changes from a doctor/clinician's server 110 interfacing with a doctor/clinician's computer 112. The data sent to the doctor's or clinician's computer may be analyzed and/or converted to, or used to form, other data useful for analysis as is described herein. Such data conversion is performed alternatively or additionally at control unit 50 of cycler 20 or at the doctor/clinician's smart device 115 or patient's smart device 116 as discussed herein.

Assessment and Maintenance of Patient Stress

Figure 2:
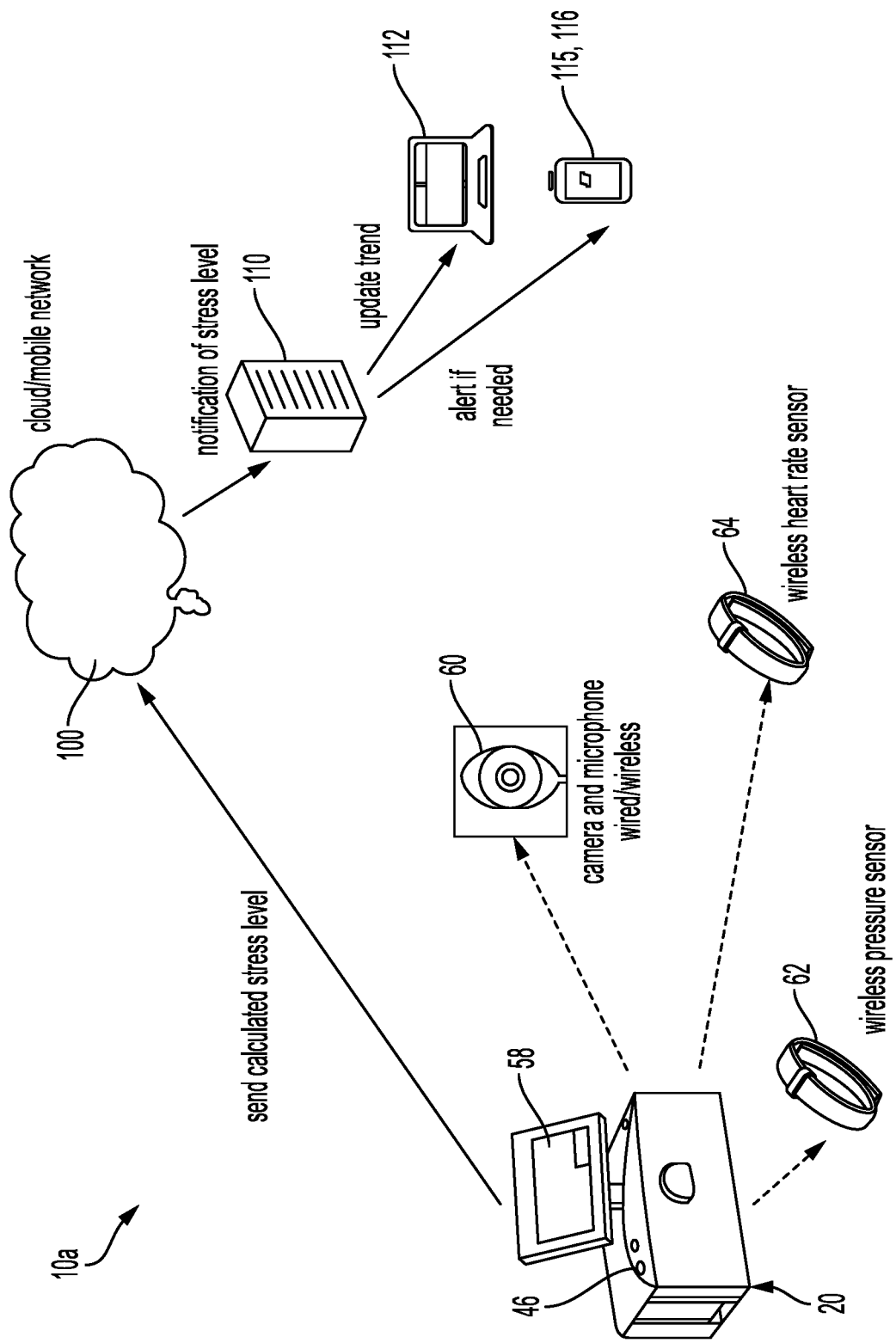
FIG. 2 is a perspective view illustrating one embodiment of a system of the present disclosure configured to assess and record a PD patient's stress level and to take one or more action accordingly if needed.
Figure 3:
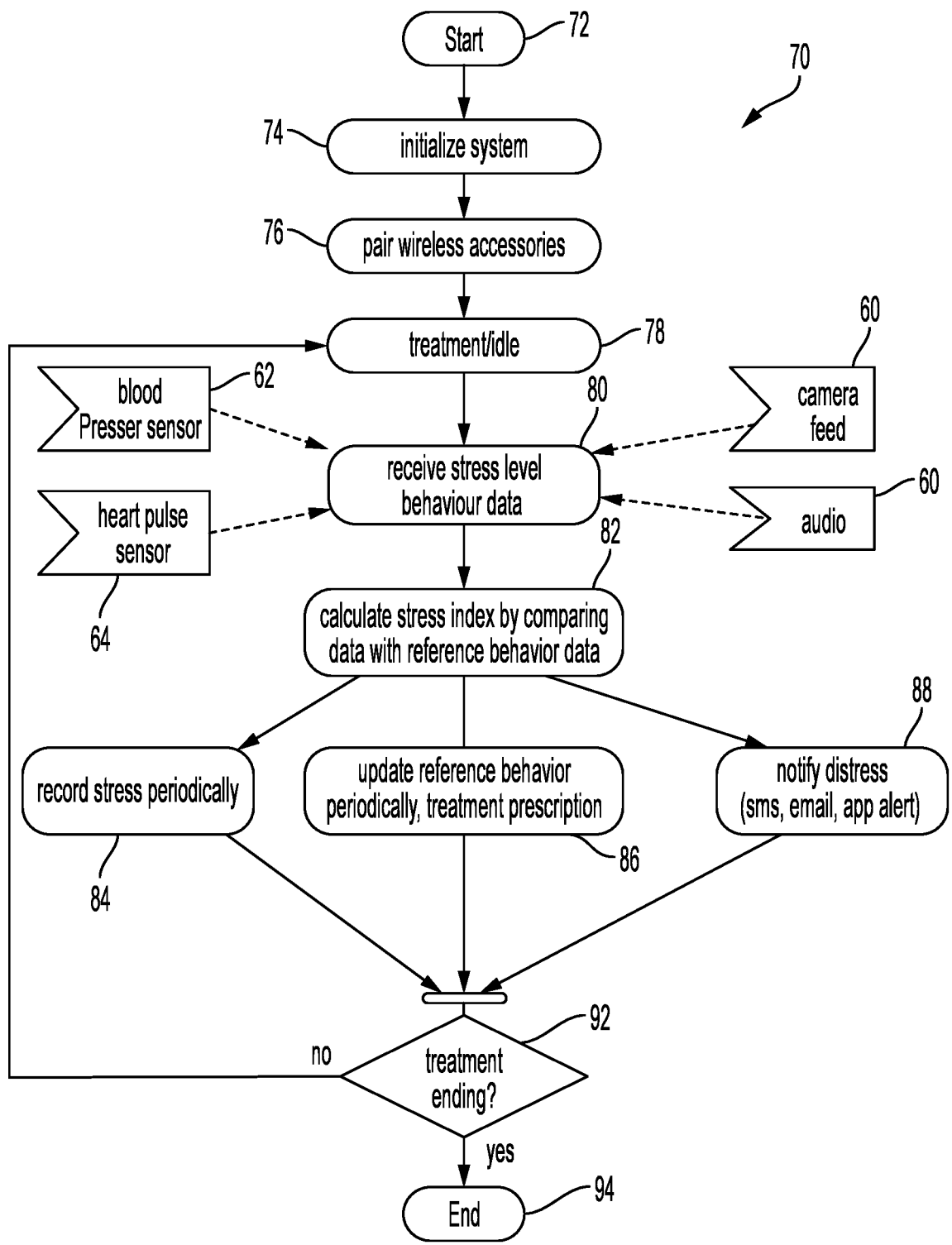
FIG. 3 is a process flow diagram illustrating one methodology for assessing and recording a PD patient's stress level and for taking one or more action accordingly if needed.

Referring now to FIGS. 2 and 3, in one embodiment peritoneal dialysis ("PD") system 10a measures and analyzes the patient's stress level and takes one or more action if needed. System 10a includes PD machine or cycler 20 discussed above, which interfaces with a number of patient stress sensors and stores and uses an algorithm at control unit 50, which analyzes output data from the sensors to determine a stress level index for the patient.

The sensors may be provided at the machine and/or worn by the patient. Machine side sensors may include an integrated camera and/or a microphone 60. Control unit 50 of PD machine or cycler 20 may itself or with the help of software stored at network 100, e.g., cloud/mobile network, analyze stress pattern facial expressions and head movements using camera 60. The output of camera 60 may also be used to analyze patient eye movement to look for stress patterns. The output of Camera 60 may be further used to look at the patient's body movements to identify stressed-related movements as compared to relaxed body movements. All of such camera data may be compared to known relaxed state images specific to the patient. Sound recordings from the patient via microphone 60 may be used by control unit 50 of PD machine 20 itself or the software stored at network 100 to identify known stressed sounds, sound levels and sound patterns.

The patient additionally or alternatively may wear one or more stress sensor(s), such as a wireless blood pressure sensor 62 and/or a wireless heart rate sensor 64, which communicates wirelessly with the PD machine or cycler 20 in one embodiment. Blood pressure and/or heart rate data from sensors 62 and 64 is analyzed either by PD machine 20 itself or is sent to the software stored at network 100 to look for output levels indicating patient stress.

Any one or more or all of the stress sensor outputs described above is fed in one embodiment into a stress algorithm stored within control unit 50 of PD machine 20, at network 100, e.g., the cloud/mobile network. The algorithm in one embodiment determines an overall patient stress index. That stress index may then be sent over cloud/mobile network 100 to a doctor/clinician's server 110, which may be accessed by a doctor/clinician's computer 112 or smartphone 115. Server 110, computer 112 and/or smartphone 115 may have its own software that is used to (i) chart the patient's stress levels, (ii) update a non-stressed patient baseline behavior periodically, and/or (iii) notify the doctor or clinician if the patient's stress level indicates that the patient needs to be contacted and possibly examined and/or that the patient's treatment prescription may need to be modified.

In the illustrated embodiment of FIG. 2, outputs from stress sensors 60, 62 and 62 are sent to cycler 20, which may indicate the sensor outputs audibly, visually or audiovisually at user interface 58. Control unit 50 calculates the patient's stress level or index and sends same to cloud/mobile network 100. In an alternative embodiment, control unit 50 of cycler 20 relays the stress sensor outputs to cloud/mobile network 100. Software at cloud/mobile network 100 or software at doctor/clinician's server 110 may alternatively calculate a new value for the patient's stress level or index. In the illustrated embodiment, doctor/clinician's server 110 creates a stress level or index trend for the patient or otherwise organizes new stress level or index values relative to old values, so that the doctor or clinician viewing same at computer 112 can make a determination whether to contact the patient, and/or update one or more PD treatment prescription stored at control unit 50 of cycler, which informs cycler 20 how to perform treatment, and/or update the patient's non-stressed baseline. In an alternative embodiment, the stress level or index trend or other organization of stress level or index values for the patient is created and updated at doctor/clinician's computer 112 using the new patient stress level or index value. FIG. 2 further illustrates that the software at cloud/mobile network 100 or at doctor/clinician's server 110 may reach a determination that the patient's current stress level or index warrants the doctor or clinician to be immediately notified at doctor/clinician's smart device 115. The doctor or clinician may then contact the patient, e.g., at the patient's smart device 116.

Referring now to FIG. 3, an embodiment for the assessment and maintenance of patient stress is illustrated by method 70. At oval 72, method 70 begins. At oval 74, system 10 is initialized, which occurs in one embodiment upon to power-up of cycler 20. Here, control unit 50 of PD machine or cycler 20 may recall the patient's non-stressed baseline and see if an updated non-stressed patient baseline has been sent from cloud/mobile network 100 cloud/mobile network 100 to the control unit. At oval 76, control unit 50 pairs with any peripheral sensors, such as wearable wireless blood 62 and/or wireless heart rate sensor 64. At oval 78, control unit 50 waits for a treatment idle state before accepting any stress measurements. That is, the stress measurements should not interrupt an ongoing treatment. A suitable treatment idle state for a PD treatment is any one of a number of patient dwells in which the PD fluid is left within the patient to perform treatment. During the patient dwell there are times when the pumps and valves of cycler 20 are not operated, allowing the stress measurements to be taken.

At oval 80, control unit 50 of cycler 20 receives stress sensor outputs from integrated camera and microphone 60, wireless blood pressure sensor 62 and/or a wireless heart rate sensor 64. The outputs from camera 60 that may be used (by control unit 50, cloud/mobile network 100 or doctor/clinician's server 110) in determining the non-stressed patient baseline and the current stress level or index include one or more of (i) facial expression, (ii) eye movement, (iii) head motion and (iv) mouth movement while talking. The outputs from microphone 60 that may be used in determining the non-stressed patient baseline and the current stress level or index include one or more of (i) word generation rate, (ii) word generation volume, and (iii) voice pitch. The outputs from wireless blood pressure sensor 62 are used (by control unit 50, cloud/mobile network 100 or doctor/clinician's server 110) to establish a non-stressed patient baseline blood pressure reading and a current blood pressure reading. The outputs from wireless heart rate sensor 64 are used (by control unit 50, cloud/mobile network 100 or doctor/clinician's server 110) to establish a non-stressed patient baseline heart rate reading and a current heart rate reading for comparison.

At oval 82, control unit 50, cloud/mobile network 100 or doctor/clinician's server 110 calculates a stress level or stress index for the patient by taking into account each of the different stress sensor outputs in one embodiment, e.g., by comparing instant stress data with non-stressed patient baseline stress data. Specialized software may be stored at control unit 50, cloud/mobile network 100 or doctor/clinician's server 110 for assessing the patient's current facial patterns, head movement, and mouth movement against baseline movements. The non-stressed patient baseline in an embodiment includes normal patient movement patterns that may be learned an updated over time. New/current microphone outputs of word generation rate, word generation volume, and/or voice pitch are also compared to baseline levels for those one or more parameters. New/current blood pressure readings and heart rate readings are likewise compared against like baseline, non-stressed readings.

The overall stress level or index is a combination of the above comparisons in one embodiment. Control unit 50, cloud/mobile network 100 or doctor/clinician's server 110 of system 10a may eliminate false stress readings if for example camera or microphone comparisons suggest that the patient is under stress, while both blood pressure and heart rate comparisons indicate that the patient is not stressed. The index may for example be from 0 to 9, with (i) 0 being no stress indicated, (ii) 1 being blood pressure or heart rate slightly elevated, (iii) 2 being both blood pressure and heart rate slightly elevated, (iv) 3 being both blood pressure and heart rate slightly elevated and one of camera or microphone data comparisons showing patient stress, (v) 4 being both blood pressure and heart rate slightly elevated and both of camera and microphone data comparisons showing patient stress, (vi) 5 being blood pressure or heart rate moderately elevated, (vii) 6 being both blood pressure and heart rate moderately elevated, (viii) 7 being both blood pressure and heart rate moderately elevated and one of camera or microphone data comparisons showing patient stress, (ix) 8 being both blood pressure and heart rate moderately elevated and both of camera and microphone data comparisons showing patient stress, and (x) 9 being either one or both blood pressure and heart rate highly elevated.

At oval 84, any one or more of control unit 50, cloud/mobile network 100, doctor/clinician's server 110 and/or doctor/clinician's computer 112 may record the newly determined patient stress level or index. At oval 84, cloud/mobile network 100, doctor/clinician's server 110 and/or doctor/clinician's computer 112 may add the newly determined patient stress level or index to a trend or other organization of past stress levels or indexes, e.g., for viewing by the clinician at doctor/clinician's computer 112. At oval 86, cloud/mobile network 100, doctor/clinician's server 110 and/or doctor/clinician's computer 112 may update the non-stressed patient baselines for any of the patient stress sensors discussed herein. At oval 86, cloud/mobile network 100, doctor/clinician's server 110 and/or doctor/clinician's computer 112 may alternatively or additionally determine if the patient's treatment prescription needs to be reviewed for example to see if it may be changed to improve patient stress management, e.g., reduce a patient PD fluid fill amount. At oval 88, system 10 may be programmed to cause an alert to be sent to the doctor/clinician's smart device 115 if the stress level or index is at or above a certain value, e.g., 7 or greater. Once notified, the doctor or clinician can contact the patient to see what issue(s) occurred during treatment and perhaps what steps can be taken to reduce the patient's stress.

At diamond 92, control unit 50 of cycler 20 determines if treatment is ending or if there is another idle state during which the patient's stress level is sensed, recorded and analyzed as described above. If so, method 70 returns to oval 78 to wait for the next idle state for cycler 20. If not, method 70 ends at oval 94.

Assessment and Management of Patient
Fluid/Caloric Intake

Referring now to FIGS. 4 to 7, in one embodiment, peritoneal dialysis ("PD") system 10b, in addition to or alternatively to analyzing patient stress as just described, measures and analyzes the patient's fluid/caloric intake and activity level to (i) potentially change the patient's treatment prescription or (ii) use a certain approved treatment prescription instead of another approved treatment prescription. APD in general performs two functions, namely, removes waste and toxins from the patient's body and removes excess liquid from the patient. Both functions can depend on how much food and liquid that the patient has ingested prior to treatment. The patient's activity level may also affect how much liquid the patient loses via perspiration. Lowering food and liquid intake and increasing sweat producing activities may allow for the PD treatment to use a lower glucose level dialysis fluid and/or for treatment times to be reduced. Conversely, the patient may need a higher level glucose fluid, longer dwell times and perhaps more APD cycles if the patient consumes larger amounts of calories and liquids, while remaining generally inactive.

System 10b in taking into account fluid/caloric intake again includes PD machine or cycler 20 that interfaces with a wearable sensor 66. Sensor 66 may include any one or more of a microphone having audio filters to listen for eating and drinking sounds, a motion sensor (e.g., accelerometer or strain gauge) to detect a drinking hand movement, a timer to detect how long an eating or drinking activity lasts. System 10b may also include a speaker 46 under control of control unit 50 at PD machine 20, or a visual alert (text or graphic) at patient's smart device 116, to alert the patient if approaching an intake limit. Sensor 66 may still further include a patient blood sugar sensor or monitor. A profile output of the blood sugar sensor or monitor 66 is monitored by control unit 50 and/or smart device 116 in one embodiment to indicate what kind of food and/or beverage is being consumed by the patient. For example, a fast response or change in the output from the blood sugar sensor or monitor indicates that the patient has consumed fast carbohydrates or sugars. A slow response or change in the output from the blood sugar sensor or monitor indicates that the patient has consumed a more protein or vegetable-based meal.

Figure 4:
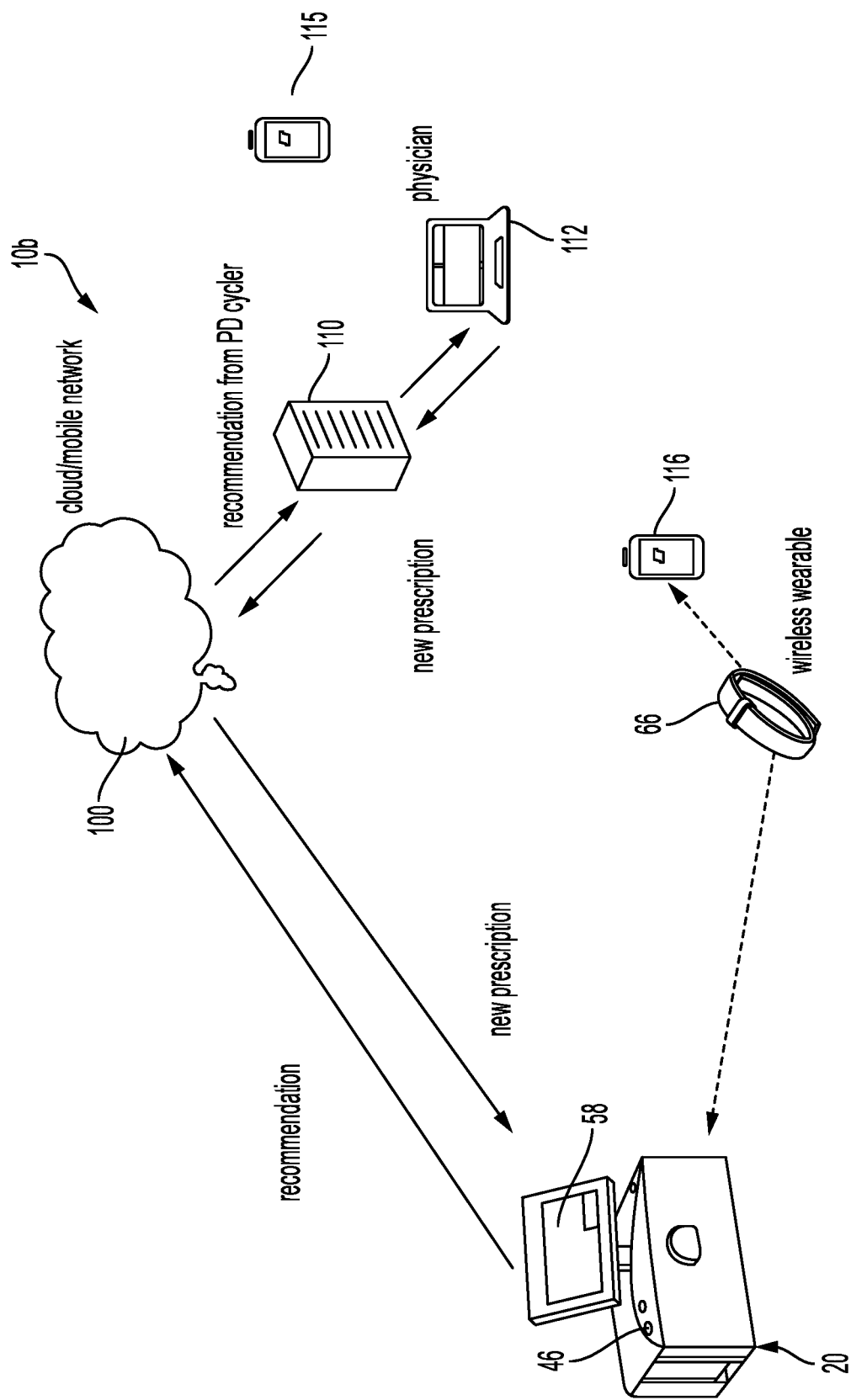
FIG. 4 is a perspective view illustrating one embodiment of a system of the present disclosure configured to assess and record a PD fluid and/or caloric intake and to take one or more action accordingly if needed.

In the illustrated embodiment of FIG. 4, wearable sensor 66 interfaces with the patient's smart device 116, e.g., smartphone. PD machine or cycler 20 as illustrated also interfaces (e.g., two-way) with software at cloud/mobile network 100, wherein control unit 50 of PD machine or cycler 20 or the software at cloud/mobile network 100 or doctor/clinician's server 110 may analyze the fluid/caloric intake data and make recommendations if needed, e.g., to choose one approved treatment prescription versus another approved treatment prescription. Cloud/mobile network 100 interfaces (e.g., two-way) with doctor/clinician's computer 112 and clinician's smart device 115 via doctor/clinician's server 110 in the illustrated embodiment. Here, the doctor or clinician may analyze the patient's fluid/caloric intake over time, e.g., via a trend or graph generated at doctor/clinician's computer 112 and/or smart device 115 and update the patient's treatment prescription(s) if needed or desirable.

In one example of fluid/caloric intake system 10b, the wireless wearable sensor 66 automatically calculates the fluid intake using audio samples from its microphone and movement sensing from its movement sensor, which are fed into an algorithm. During treatment setup, the patient may be asked to drink water from a reference glass so that the wearable software learns the patient's fluid intake pattern using the audio samples, hand movements and reference glass volume. The wireless wearable also computes the patient's physical activity using hand movement and heart pulse rate. Diet information may be obtained from a mobile application on patient's smart device 116. Food and fluid intake may alternatively or additionally also be entered manually via a mobile application at smart device 116 or perhaps at user interface 58 of PD machine or cycler 20. PD machine or cycler 20 in an embodiment is able to communicate with the patient's wireless wearable sensor 66 when the sensor is within a communication vicinity, e.g., via Bluetooth or WiFi, to retrieve dietary information from the wearable sensor. PD machine or cycler 20, patient smart device 116 and/or software at cloud/mobile network 100 or doctor/clinician's server 110 may analyze the fluid/caloric activity information and recommend to the doctor or clinician to change the patient's treatment prescription if the current treatment prescription is not sufficient, or is too stringent, based on the received and analyzed data. PD machine or cycler 20, the patient's smart device 116 and/or the doctor or clinician may also advise, e.g., provide corrective measures, the patient about fluid intake and diet.

Figure 5:
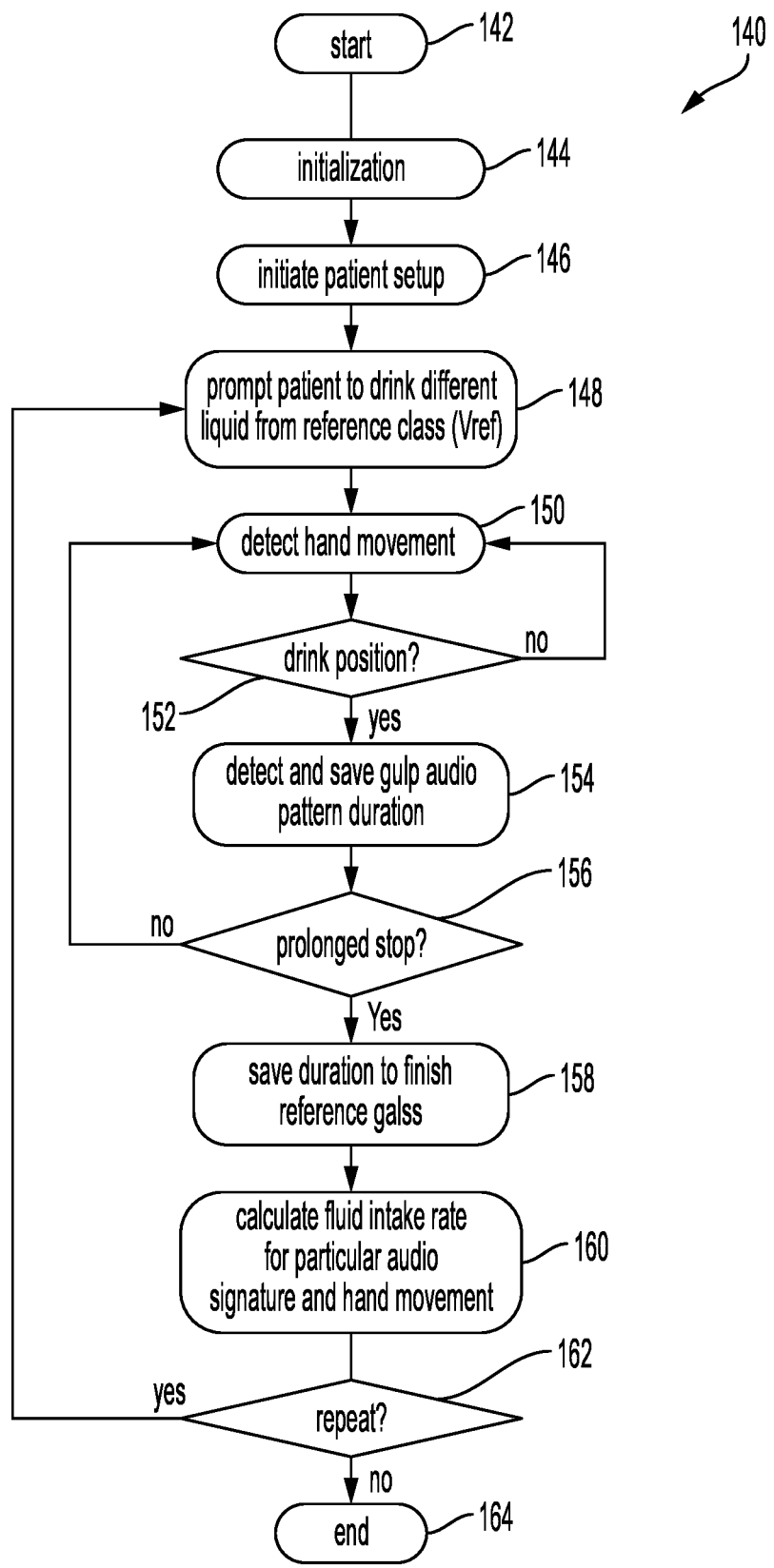
FIG. 5 is a process flow diagram illustrating one methodology for establishing a patient's reference fluid or caloric intake flowrate.

Referring now to FIG. 5, an embodiment for initiating the use of microphone and motion detection wearable sensor 66 is illustrated by method 140. Method 140 in essence trains system 10b how to use the output from system 10b. At oval 142, method 140 begins. At oval 144, system 10b is initialized, which occurs in one embodiment upon power-up of PD machine or cycler 20. Here, control unit 50 may look to pair with microphone and motion detection wearable sensor 66. At oval 146, user interface 58 of PD machine or cycler 20 or patient smart device 116 prompts the patient to perform setup, which includes obtaining a known volume glass or cup and a known liquid. At oval 148, user interface 58 of PD machine or cycler 20 or patient smart device 116 prompts the patient to drink the known volume of liquid from the glass or cup. At oval 150, the motion detection of wearable sensor 66 detects any hand movement by the patient.

At diamond 152, control unit 50 or patient smart device 116 determines if the detected hand movement at oval 150 is a drinking positon. If not, then method 140 returns to oval 150 to wait until another hand movement is detected by the motion detection of wearable sensor 66. If the detected hand movement is a drinking positon at determined at diamond 152, then the microphone of wearable sensor 66 at block 154 detects a patient gulp or drinking pattern duration and sends same to control unit 50 or patient smart device 116.

At diamond 156, control unit 50 or patient smart device 116 determines if there is a prolonged motion stop, indicating that the patient has finished the drink. If there is no prolonged motion stop, then another detected hand movement by sensor 66 occurs and method 140 returns to oval 150. If there is a prolonged motion stop at diamond 156, then method 140 assumes that the patient has consumed the full volume of liquid within the glass or cup, and at oval 158, control unit 50 or patient smart device 116 saves to memory the patient's drinking duration needed to finish the reference volume of liquid.

At oval 160, control unit 50 or patient smart device 116 calculates the patient's reference intake flowrate for the particular audio signature recorded by microphone of wearable sensor 66 and for the particular hand movement recorded by motion detector of wearable sensor 66. The reference intake flowrate ($V_{ref}/T_{ref}$) is in one embodiment the reference glass volume $V_{ref}$ divided by the total reference time $T_{ref}$ that motion detector and microphone of wearable sensor 66 detects that the patient is drinking from the glass. At diamond 162 control unit 50 or patient smart device 116 determines whether the patient should be prompted again to perhaps drink a different liquid and/or amount of liquid to gain additional learning for system 10b. If so, then method 140 returns to oval 148. If not, then method 140 ends at oval 164.

Figure 6:
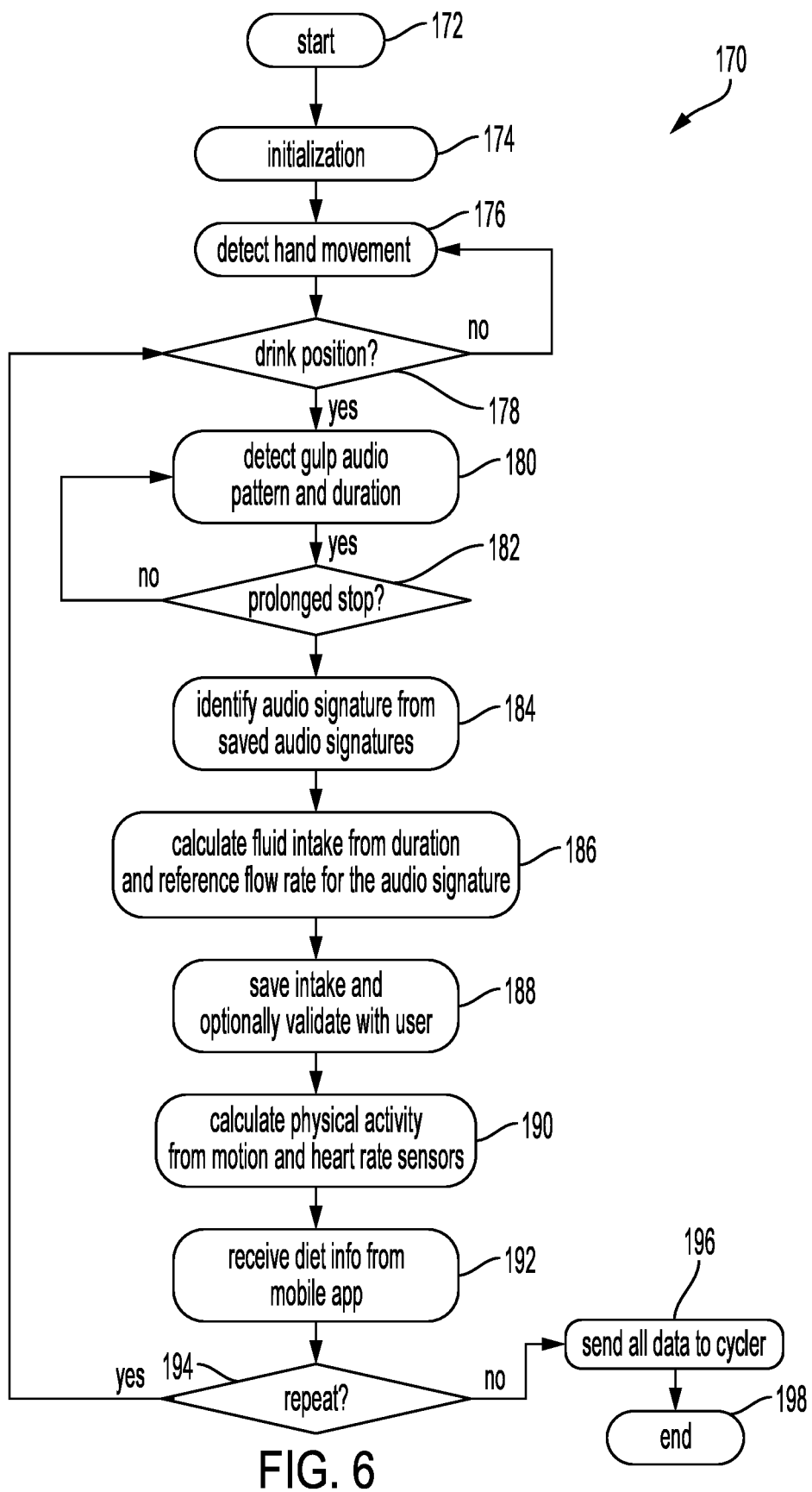
FIG. 6 is a process flow diagram illustrating one methodology for determining a patient's fluid or caloric intake over a specified time duration.

Referring now to FIG. 6, an embodiment for operating under normal operation after initiating the use of microphone and motion detection wearable sensor 66 is illustrated by method 170. Method 170 takes fluid and caloric intake measurements of the patient during and between treatments. At oval 172, method 170 begins. At oval 174, method 170 of system 10b is initialized, which occurs in one embodiment upon power-up of PD machine or cycler 20. Here again, control unit 50 of cycler 20 may look to pair with microphone and motion detection wearable sensor 66.

At oval 176, the motion detector of wearable sensor 66 detects a hand movement by the patient. At diamond 178, control unit 50 of cycler 20 or the patient's smart device 116 compares the detected hand movement to a stored or saved drinking position hand movement to determine if the detected hand movement is a drinking position hand movement. If not, then method 170 returns to oval 176 and waits for the next detected hand movement. If so, then control unit 50 of cycler 20 or the patient's smart device 116 at oval 180 looks to the output of the microphone of wearable sensor 66 to record the drinking pattern sounds and the duration of same.

At diamond 182, control unit 50 of cycler 20 or the patient's smart device 116 looks to detect a prolonged stoppage of either one or both of the drinking position hand movement output or the drinking pattern sound output. If not, and the patient continues to consume the liquid, then method 170 returns to oval 180. If so, then control unit 50 of cycler 20 or the patient's smart device 116 determines that the drinking or consuming has stopped.

At oval 184, control unit 50 of cycler 20, the patient's smart device 116, network 100 or doctor/clinician's server 110 identifies and audio signature for the sound just detected at oval 180 from a plurality of stored audio signature. The example used for methods 140, 170 and 210 is the patient consuming a liquid. Methods 140, 170 and 210 of system 10b are equally applicable to the consumption of food and the tracking of caloric intake. The consumption of water affects the amount of patient ultrafiltration to remove, while the patient's caloric intake affects how much solvent and waste removal needs to take place over the course of treatment. At oval 184, the audio signature may identify liquid versus food intake (e.g., identifying drinking versus chewing sounds) and in an embodiment identifies the type of food ingested (e.g., crunchy versus chewy). In an embodiment, the reference intake flowrate $V_{ref}/T_{ref}$ (from block 160 of method 140) is different for different audio signatures, so identifying the audio signature identifies the reference intake flowrate $V_{ref}/T_{ref}$ for use at oval 186.

At oval 186, software located at control unit 50 of cycler 20, the patient's smart device 116, network 100 or doctor/clinician's server 110 calculates the amount of fluid ingested (or caloric intake from food ingested). Here fluid intake may be calculated by multiplying the just recorded duration T by the reference intake flowrate $V_{ref}/T_{ref}$ (from block 160 of method 140) and by two factors C and L, where C is an interpolation factor based on the patient's profile stored in software and L is a change factor that is stored and updated based on learning performed at control unit 50 of cycler 20, the patient's smart device 116, network 100 or doctor/clinician's server 110. In an embodiment, fluid ingested=$T*V_{ref}/T_{ref}*C*L$.

Factor C for example includes an audio signature (e.g., gulp) for each patient and for different liquids, which are correlated to an amount of liquid intake. Factor C may be part of a patient's profile and may be learned during setup or other learning period in which the patient is asked to ingest known liquids (e.g., hot tea, water, cold drinks, etc., from a known volume cup). System 10b identifies the associated audio signatures and determines a correlation to an amount of liquid ingested.

Factor L for example includes other elements that can affect volume intake that may be learned during a learning period. The other factors may for example include how fast or slow the patient typically drinks or eats, which may be derived from patient motion sensor movement, container inclination (angle), etc., and their relation to volume of liquids or solids ingested. During the setup or other learning period, the patient for example may be asked to drink liquids at different rates, from different containers, and from different container angles.

At oval 188, at least one of control unit 50 of cycler 20, the patient's smart device 116, network 100 or doctor/clinician's server 110 saves the calculated amount of fluid ingested and/or the calculated caloric intake. Optionally, at oval 188, control unit 50 of cycler 20 and/or the patient's smart device 116 validates the calculated amount of fluid ingested and/or the calculated caloric intake. For example, cycler 20 and/or the patient's smart device 116 may visually, audibly or audiovisually query the patient, e.g., "our data suggests that you have had three glasses (48 oz) of a liquid in the past eight hours. Does this sound correct? [Y] or [N]". The patient then confirms or denies by pressing yes or no. If no, cycler 20 and/or the patient's smart device 116 may visually, audibly or audiovisually query the patient as to how much liquid the patient has consumed over a certain time period. Such feedback may be used in the learning or artificial intelligence feedback loop for the L factor of the formula for determining the amount of food ingested.

At oval 190, software located at control unit 50 of cycler 20, the patient's smart device 116, network 100 or doctor/clinician's server 110 calculates the amount of physical activity the patient has had over a designated time period. The calculation may be based on outputs from the motion detector of wearable sensor 66 and/or from a heart rate sensor, e.g., a separate heart rate sensor 64 illustrated in FIG. 2. The amount of physical activity may be taken into account in determining how much UF to remove from the patient in combination with the amount of food ingested calculated at oval 186.

At oval 192, software located at control unit 50 of cycler 20, the patient's smart device 116, network 100 or doctor/clinician's server 110 receives dietary information, e.g., from an application stored at the patient's smart device 116. The dietary information may be used in combination with the calculated caloric intake to determine or estimate how much waste and toxins need to be removed from the patient in the next treatment.

At diamond 194, method 170 determines if there are still patient hand movements to detect over a given time period leading up to a next treatment. If so, method 170 returns to oval 176 and the process described above is repeated. If not, then at oval 196 all data not already present at PD machine or cycler 20 is sent to control unit 50 of cycler 20. At oval 198, method 170 ends.

Figure 7:
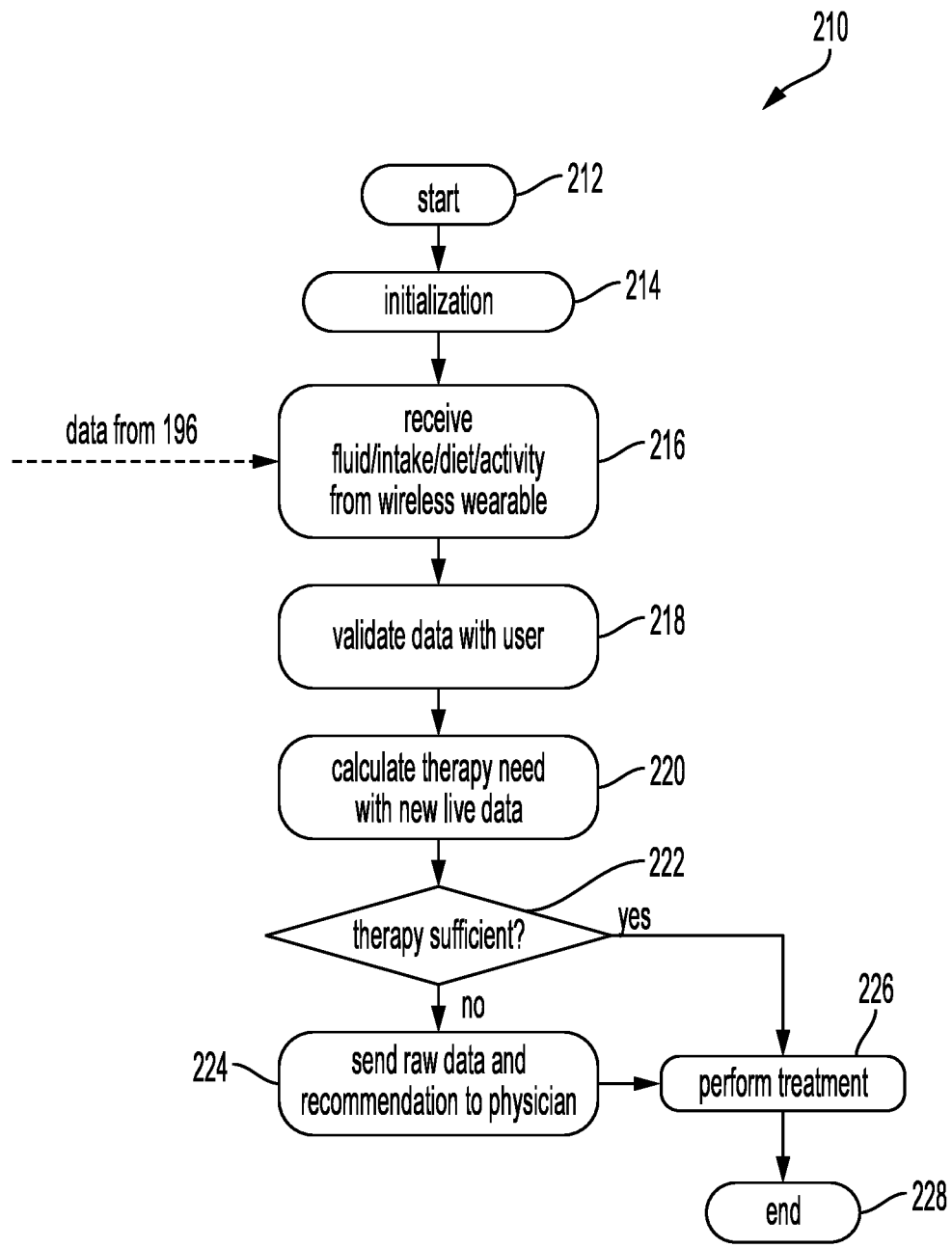
FIG. 7 is a process flow diagram illustrating one methodology for using the patient's fluid or caloric intake for choosing or modifying a treatment prescription.

Referring now to FIG. 7, an embodiment for how system 10b interfaces with the PD machine or cycler 20 of system 10b is illustrated by method 210. At oval 212, method 210 starts. At oval 214, PD machine or cycler 20 performs an initialization, which may be the startup steps taken for PD machine or cycler 20 to perform a treatment, e.g., integrity checks, pressure checks, etc. Initialization may also include prompting the patient to perform setup steps, such as, loading disposable set 120 into cycler 20 and making fluid connections.

At oval 216, control unit 50 of PD machine or cycler 20 receives any data from oval 196 of method 170, which is all data generated in method 170 that is not generated and thus already present at PD machine or cycler 20. Such data includes calculated liquid intake and/or calculated caloric intake. At oval 218, control unit 50 of PD machine or cycler 20 validates the data with the patient, e.g., visually, audibly or audiovisually queries the patient, e.g., "our data suggests that you have had three glasses (48 oz) of a liquid in the past eight hours. Does this sound correct? [Y] or [N]"; "our data suggests that you have taken 3000 steps over the past eight hours. Does this sound correct? [Y] or [N]". The patient then confirms or denies by pressing yes or no to each validation question.

At oval 220, control unit 50 of PD machine or cycler 20 calculates a patient's treatment need, e.g., selects an appropriate treatment prescription from a plurality of preapproved treatment prescriptions. The preapproved treatment prescriptions may include a high ultrafiltration ("UF") treatment prescription, a medium UF treatment prescription or a low UF treatment prescription. If the patient has not consumed much liquid and has been active over the analyzed time period, then PD machine or cycler 20 may suggest the low UF treatment prescription. If the patient has consumed a fair amount of liquid and has been generally inactive over the analyzed time period, then PD machine or cycler 20 may suggest the high UF treatment prescription, etc.

At diamond 222, control unit 50 of PD machine or cycler 20 determines if any one or more of the patient's approved treatment prescriptions needs to be modified, e.g., if the calculated treatment need at block 220 is not met by an existing treatment. If therapy is not sufficient as determined at diamond 222, control unit 50 of PD machine or cycler 20 sends all pertinent liquid and/or caloric intake data and perhaps a recommendation to network 100 or doctor/clinician's server 110. The doctor or clinician at doctor/clinician's computer 112 may then run software with the newly received data to develop a new treatment prescription for the patient, which can then be downloaded to control unit 50 of PD machine or cycler 20.

Regardless of whether any one or more of the patient's approved treatment prescriptions needs to be modified, as determined at diamond 222, control unit 50 of PD machine or cycler 20 next performs a treatment on the patient, perhaps using the most suitable treatment prescription even if not completely adequate. That is, method 210 does not prevent treatment from proceeding in one embodiment. At oval 228, method 210 ends.

Assessment and Management of Patient Sleep Patterns I

Figure 8:
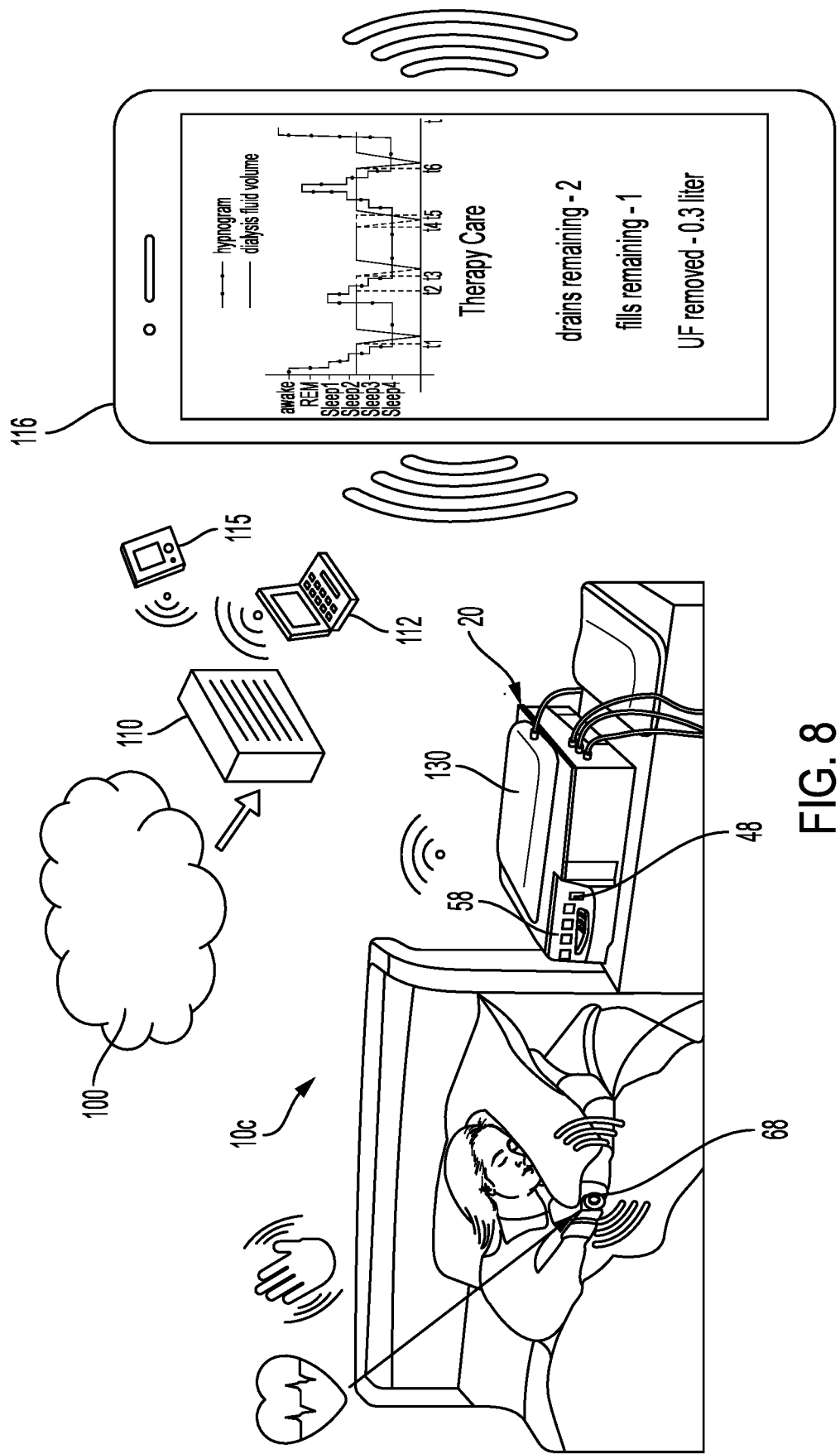
FIG. 8 is a perspective view illustrating one embodiment of a sleep monitoring and optimization system of the present disclosure.
Figure 9:
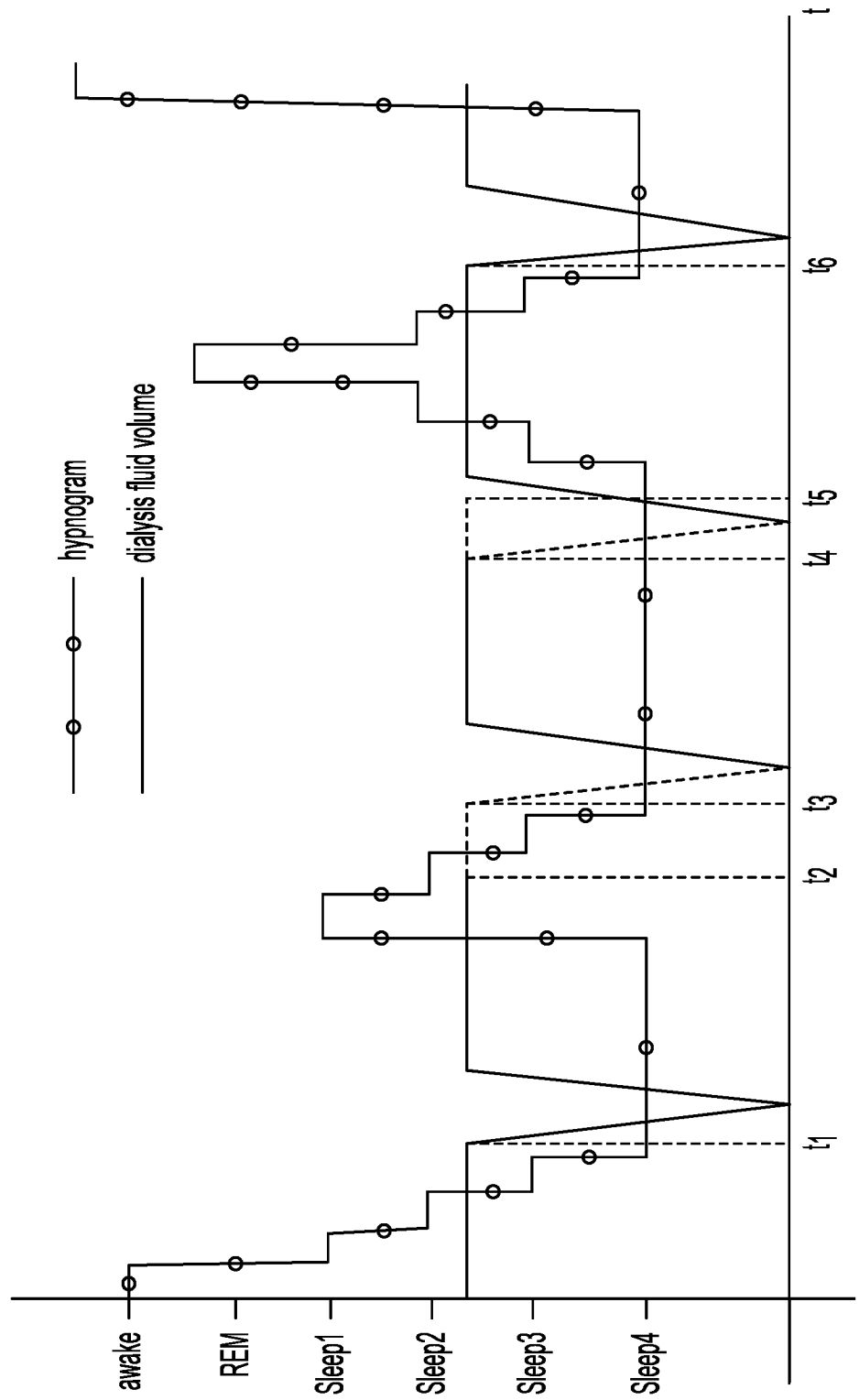
FIG. 9 is a hypnogram plot over time showing the timing of multiple patient drains and patient fills in relation to the patient's sleep state.

Referring now to FIGS. 8 and 9, in one embodiment PD system 10c, in addition to or alternatively to analyzing patient stress and/or liquid/caloric intake as just described, measures and analyzes the patient's sleep patterns during nighttime APD treatments (which are typical) to potentially alter the timing of certain machine functions with the goal of helping the patient get a good night's sleep. Sleep system 10c generally involves sleep sensing, learning, applying what has been learned to further sensing, and potentially modifying ongoing treatments and treatment prescriptions to aid patient sleep. FIG. 8 illustrates that sleep sensing system 10c may include one or more sensor(s) located either at PD machine or cycler 20, on the patient (e.g., a wearable sensor 68), or on a peripheral device such as the patient's smart device 116, which records physiological signals correlated to the patient's sleep state.

The sensor(s) at cycler 20 may for example be a camera that records the patient, a blood pressure cuff that may be pressurized via pneumatic pressure used for actuating the pump and valve chambers of disposable cassette 122, and/or a microphone 48. Control unit 50 may be programmed to monitor the camera feed for patient movement and/or to intermittently take the patient's blood pressure reading. The output of microphone 48 may be used to detect snoring sounds and sounds associated with sleep disturbance, e.g., patient movement sounds. The sensor(s) at wearable sensor 68 may sense for any one or more of blood pressure, heart rate, respiratory rate, oxygenation level, temperature, movement and combinations of same. The sensor(s) at the patient's smart device 116 may also include a motion sensor and/or a microphone.

The learning or artificial intelligence ("AI") aspect of sleep system 10c involves the use of sensed data to learn the patient's sleeping patterns and sleep state (e.g., deep sleep, rapid eye movement ("REM"), and awake). After the patient's sleep patterns have been learned, control unit 50 of PD machine or cycler 20 may be modified as to (i) how PD fluid pumping (filling or draining) takes place at disposable cassette 122 (FIG. 1), (ii) how alarms and alerts are delivered, e.g., at user interface 58 and (iii) whether or not to have PD machine or cycler 20 play soothing sounds via speakers provided in connection with user interface 58. Each of (i) to (iii) is provided with the goal of minimizing sleep disruption and promoting as healthy a night of sleep as possible. The sensed sleep data may also be transferred to a doctor's or clinician's digital support platform, e.g., at network 100, doctor/clinician's server 110, doctor/clinician's computer 112 and/or doctor/clinician's smart device 115. Here, the data is analyzed to determine if and how a patient's treatment prescription may be modified to minimize sleep disruption, while still providing the required fluid removal and solute clearance.

Referring now to FIG. 9, one possible optimization technique provided by control unit 50 of PD machine or cycler 20 is to perform patient fills and drains when the patient is out of or coming out of a deep sleep state so as not to disturb the deep sleep state. Another possible optimization technique is for control unit 50 to test the patient to determine if draining and filling wakes the patient during a deep sleep state. If the outcome of the test shows that the patient in a deep sleep state is not bothered by pump and valve actuations, control unit 50 then performs patient fills and drains during the patient's deep sleep so that the patient is less likely to be wakened at all due to filling or draining. Here, control unit 50 of the PD machine or cycler 20 may be programmed to use a learned and stored sleep pattern for the patient in combination with the output from at least one sleep state sensor (e.g., wearable sensor 68). The stored sleep pattern provides predictive information, while the output from the one or more sleep state sensor(s) (e.g., wearable sensor 68) provides real time information.

Control unit 50 in an embodiment uses the real time sensor information to know when the patient has entered a deep sleep state, which has been tested to confirm that it is safe (does not disrupt the deep sleep state) to perform pumping and valving activities, e.g., via the actuation of disposable cassette 120. Pumping and valving activities through at least most of a PD treatment involve a patient drain followed by a patient fill. It is wasteful to wait to start a patient fill after a patient drain has ended because the patient is empty (or near empty) and thus treatment is not taking place. The goal of system 10c is accordingly to position the combination of a patient drain followed by a patient fill so that either (i) the patient drain and fill are fully completed before the patient leaves a current deep sleep state or (ii) the patient drain and fill are not started until the patient has entered a subsequent deep sleep state. The variable that control unit 50 uses to locate patient draining and filling within a deep sleep state is the duration of the dwell period between a patient fill and a next patient drain.

Another way of stating the goal of sleep optimization system 10c is to complete the patient drain and patient fill while the patient is in a deep sleep state so as not to wake the patient, assuming testing has verified that draining/filling will not wake the particular patient while in a deep sleep state. Control unit 50 uses the output from at least one sleep state sensor (e.g., wearable sensor 68) to know when the patient enters or leaves a deep sleep state and if possible does not allow a patient drain and subsequent fill to begin if the patient is not in a deep sleep state.

After the patient drain and patient fill is performed while the patient is in a deep sleep state, control unit 50 uses the patient's predictive information to know how long to set the dwell period for the latest patient fill. Dwell periods can vary from patient to patient and are set to an optimal dwell time for a patient often based on the patient's peritoneal membrane transport characteristics. But there is typically room for varying the dwell time. So if the predictive information reveals that the patient will come out of a deep sleep state during the dwell but enter a new deep sleep state at a time that is a little longer than the patient's optimal dwell time, control unit 50 of system 10c may cause the current dwell period to be extended until the real time data from the sleep state sensor indicates that the patient is again in a deep or at least in a deeper sleep state. Control unit 50 may also store a maximum dwell time period within which transport continues to occur across the patient's peritoneal membrane into the patient's peritoneal cavity. After the maximum dwell time, transport may actually reverse, causing reabsorption of PD fluid and patient ultrafiltration in the patient's peritoneal cavity by crossing the peritoneal membrane and entering the patient's bloodstream. Therefore, control unit 50 in an embodiment will not extend a dwell time past the maximum dwell time even if it means part of the next patient drain will occur prior to the patient entering a next predicted deep sleep state. Or as described next, control unit 50 may look to instead shorten the optimal dwell time.

If on the other hand, the predictive information reveals to control unit 50 that the patient will come out of a deep sleep state during the next patient drain and fill, then the control unit 50 may cause the programmed or optimal dwell time to be shortened in an attempt to complete the patient drain and the patient fill prior to the patient beginning to come out of the deep sleep state. Patient fill times are fairly consistent based on fill volumes and fill flowrates set at control unit 50. Patient drain times may vary however based on patient position, catheter location, etc. The patient drain times may therefore be estimated or averaged and involve draining at least a minimum amount of effluent, such as, at least 85% of fill volume plus an estimated patient ultrafiltration volume (e.g., 7% of fill volume). In any case, control unit 50 in an embodiment does not reduce the dwell time from the programmed or optimal dwell, based on the patient fill time and estimated patient drain time, to a point that the dwell is too short to provide effective treatment, e.g., less than 75% of the programmed or optimal dwell time. Here, control unit 50 only reduces the dwell time by an allowable amount even if it means the patient will begin to come out of a deep sleep state prior to a completion of the next patient fill.

FIG. 9 illustrates examples of the above programming for control unit 50. FIG. 9 may be displayed as it occurs in real time on patient's smart device 116 as illustrated in FIG. 8. FIG. 9 shows two plots, one the patient's hypnogram or sleep diagram, which has been generated for the patient based on testing and monitoring via the at least one sleep state sensor (e.g., wearable sensor 68). The histogram is stored in one or more memory 54 and accessed via one or more processor 52 of control unit 50. The other plot is of dialysis fluid volume and shows patient drains, fills and dwells. During treatment, including patient draining and filling, control unit 50 also receives signals from at least one sleep state sensor (e.g., wearable sensor 68). The different sleep states include: awake, REM and Sleep 1 to Sleep 4, with Sleep 4 being the deepest sleep.

In the illustrated embodiment, control unit 50 waits for a deep sleep (Sleep 4) signal from at least one sleep state sensor (e.g., wearable sensor 68) before initially draining a previous last fill (or midday exchange) from the patient at time $t_1$. The first action could alternatively be an initial patient fill if the patient is initially empty (here, control unit 50 may first attempt a patient drain and quickly determine that the patient is empty). In any case, it is contemplated to store at control unit 50 a maximum duration or limit for time $t_1$ after which control unit starts the initial patient drain or patient fill regardless of the patient's sleep state.

Based on time $t_1$, the patient's optimal or programmed dwell time for the first patient fill ends at time $t_2$ at which point the next patient drain would begin. Control unit 50 is programmed to determine from the hypnogram however that time $t_2$ occurs while the patient is projected to be at a sleep state of only Sleep 2. Control unit 50 also determines from the hypnogram that the patient should return to deep Sleep 4 at $t_3$, which occurs shortly after time $t_2$. Control unit 50 accordingly extends the end of the optimal or programmed dwell from time $t_2$ to time $t_3$. To do so however in one embodiment, control unit 50 first checks that extending the dwell to time $t_3$ does not cause a maximum dwell time to be exceeded—which could cause patient transport to occur in an opposite direction across the peritoneal membrane into the patient's bloodstream. Once the maximum dwell time check is cleared (that is, the additional time from $t_2$ to $t_3$ does not cause the maximum dwell time to be exceeded), the second patient drain (and subsequent patient fill) is delayed so as to begin at time $t_3$ after the patient has entered deep Sleep 4, which is confirmed in one embodiment via an output from the at least one sleep state sensor (e.g., wearable sensor 68).

Based on time $t_3$, the patient's optimal or programmed dwell time for the second patient fill ends at time $t_5$, at which point the next patient drain would begin. Control unit 50 is programmed, knowing the patient fill time and estimating the patient drain time, to determine from the hypnogram however that beginning a patient drain at time $t_5$ would cause at least part of the patient drain and/or at least part of the subsequent patient fill to occur while the patient is in a lighter sleep state 2 or 3. Control unit 50 also determines that the end of the dwell time for the second patient fill can be shortened by a relatively small amount to time $t_4$, which would allow the patient drain and patient fill to be completed before the patient leaves the current deep sleep state 4. To do so however in one embodiment, control unit 50 first checks to ensure that shortening the dwell to time $t_4$ does not cause the second fill's dwell period to be too short to provide effective treatment, e.g., less than 75% of the programmed or optimal dwell time $t_5$. Once the minimum effective dwell time check is cleared (that is, the reduction in time from $t_5$ to $t_4$ does not cause the minimum effective dwell time to be violated), the third patient drain (and subsequent patient fill) is moved up so as to begin at time $t_4$, which allows enough time for a patient drain and fill to occur during deep Sleep 4, which is confirmed in one embodiment via an output from the at least one sleep state sensor (e.g., wearable sensor 68).

Based on time $t_5$, the patient's optimal or programmed dwell time for the third patient fill ends at time $t_6$, at which point the final patient drain followed by a last fill would begin. Control unit 50 is programmed to determine from the hypnogram that the final patient drain and patient fill beginning a patient drain at time $t_6$ would each be completed while the patent is in deep sleep state 4. Control unit 50 would allow the final patient drain to begin at time $t_6$ accordingly. After the final patient drain, the patient is filled with a last fill volume of an extended dwell duration formulation of PD fluid, such as icodextrin. The patient's last fill is completed before the patient wakes from deep Sleep 4.

In an embodiment, control unit 50 is programmed to provide the patient an option allowing a PD treatment to be time based or cycle based. A time based PD treatment sets a total time for the overall treatment so that treatment is sure to be completed by a certain time assuming the PD treatment starts on time. Here, control unit 50 has flexibility to shorten or lengthen patient dwells. Nevertheless, it is contemplated for control unit 50 running a time based PD treatment that an overall dwell time (the addition of all individual dwell times) meets a prescribed overall dwell time. So if one or more patient dwells is shortened for sleep states reasons as described above, control unit 50 will attempt to lengthen one or more other patient dwell (but not so much that reverse transport occurs), so that the actual overall dwell time meets the prescribed overall dwell time. In this way, an optimal PD treatment is provided. Cycle based PD treatments typically fixedly set the dwell times. Here, patient dwell times may be lengthened for sleep state reasons discussed above but typically not shortened, such that an optimal PD treatment is again provided. It is contemplated as a compromise for cycle based PD treatments to allow a patient dwell time to be shortened for sleep state reasons, but only up to a certain amount, e.g., ten minutes. Here, control unit 50 would again try to make up any shortened patient dwell time in one more subsequent patient dwell.

Another optimization technique for sleep monitoring system 10c is for control unit 50 to not alarm if at all possible during a deep sleep state and to save non-critical alerts or alarms to the morning if safe to do so regardless of sleep state. It also contemplated for control unit 50 of PD machine or cycler 20 of system 10c to cause soothing sounds to be played by one or more speaker(s) provided in association with user interface 58, e.g., rolling waves or thunder, during certain sleep states, e.g., deep sleep states.

As further illustrated in FIG. 8, PD machine or cycler 20 may further be linked to software at cloud/mobile network 100 and/or doctor/clinician's server 110 interfacing with a doctor/clinician's computer 112 and/or doctor/clinician's smart device 115 to upload recorded sleep data for analysis and for developing sleep trends over time. The sleep trends over time may be used for artificial intelligence purposes to develop more productive sleep algorithms and for the doctor/clinician to fine-tune or develop new treatment prescriptions, which may be generic for multiple patients or specific to a particular patient.

Assessment and Management of Patient Sleep Patterns II

Figure 10:
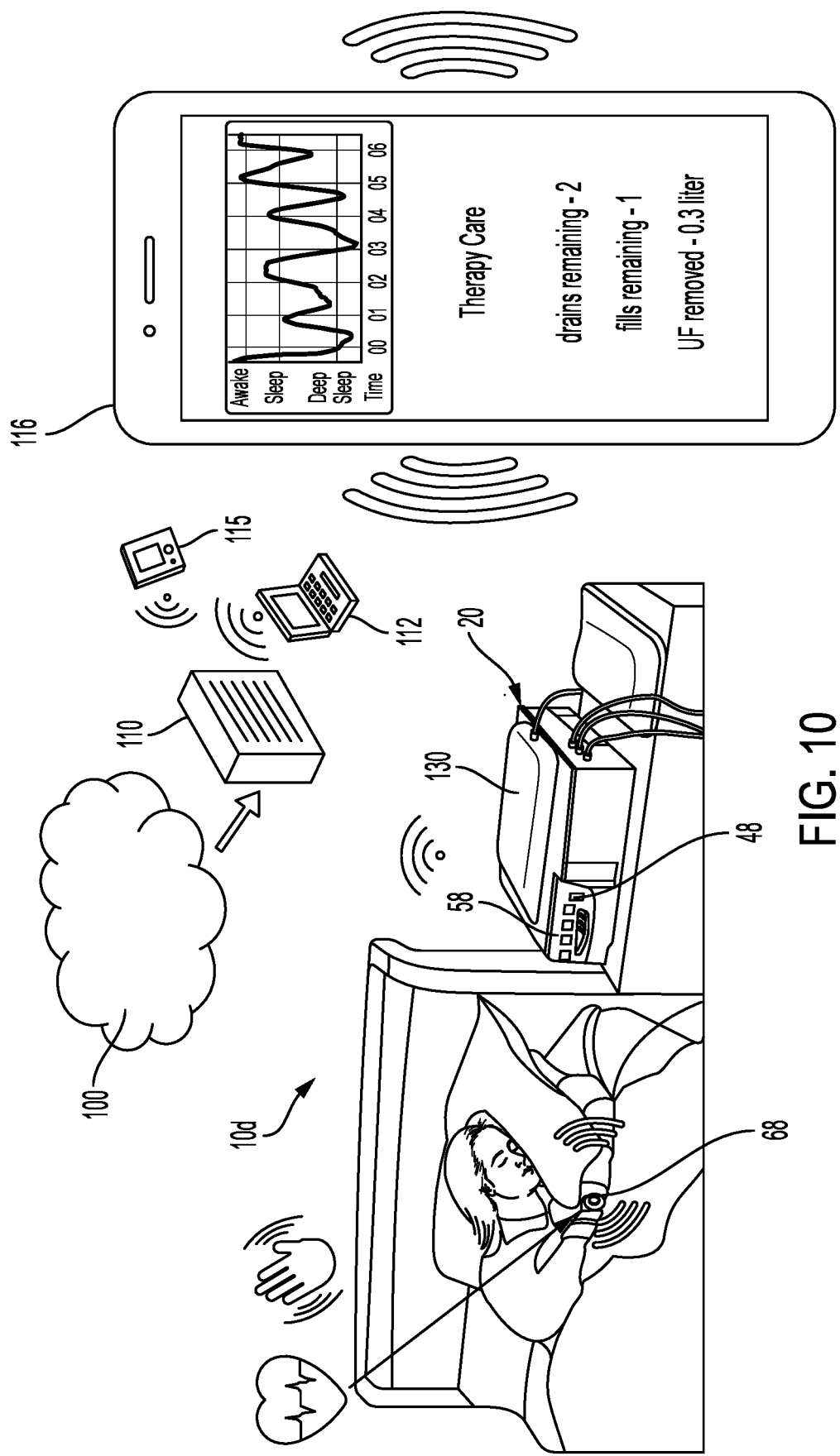
FIG. 10 is a perspective view illustrating an alternative embodiment for a sleep monitoring and optimization system of the present disclosure.
Figure 11:
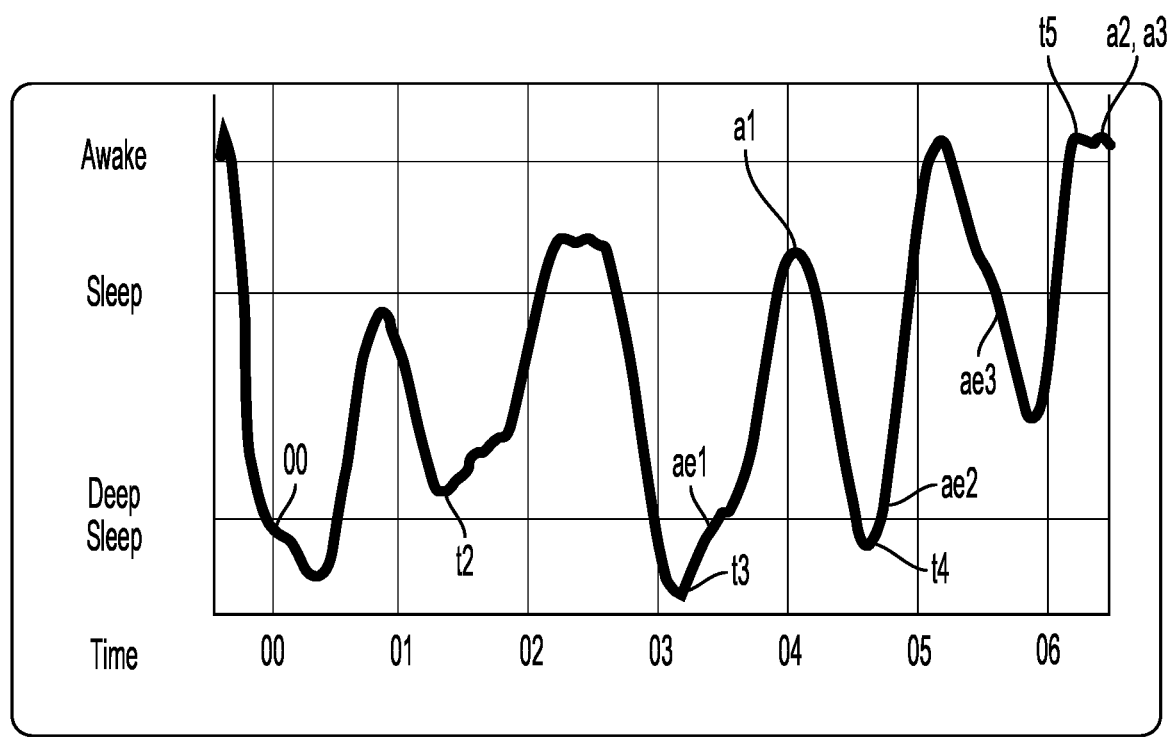
FIG. 11 is a hypnogram plot over time showing the timing of multiple alarm events and corresponding alarms in relation to the patient's sleep state.

Referring now to FIGS. 10 and 11, in an alternative embodiment PD system 10d, in addition to or alternatively to analyzing patient stress and/or liquid/caloric intake described above for systems 10a and 10b, measures and analyzes the patient's sleep patterns during nighttime APD treatments (which are typical) to potentially alter the timing of certain machine functions with the goal of helping the patient get a good night's sleep. Sleep system 10d, like system 10c, in one embodiment involves shortening or lengthening a patient dwell to ensure that a patient drain followed by a patient fill occurs during a deep sleep state. To this end, system 10d includes all the structure, functionality and alternatives discussed above for system 10c for shortening or lengthening a patient dwell to ensure that a patient drain followed by a patient fill occurs during a deep sleep state.

It is contemplated with system 10d to alternatively shorten or lengthen a patient dwell to ensure that a patient drain followed by a patient fill occurs during a lighter sleep state. Here, system 10d using cycler 20 may be configured to perform one or more trial treatment on the patient testing both scenarios (i) adjusting patient dwells so that the patient drains/patient fills occur during deep sleep states and (ii) adjusting patient dwells so that the patient drains/patient fills occur during lighter sleep states. The one or more trial treatment may show that the patient drain/patient fill wakes the particular patient even in a deep sleep state and that it is better overall in subsequent treatments for cycler 20 to let the patient sleep through deep sleep states and instead perform patient drains/patient fills in lighter sleep states knowing that the patient is likely to be awakened. The results of the trial treatment in (ii) may be used to confirm that the patient feels overall more rested when the patient is undisturbed during deep sleep states and when the patient drains/patient fills occur during lighter sleep states. Conversely, if the one or more trial treatment results indicate that the patient drain/patient fill does not wake the patient in a deep sleep state but does wake the patient in lighter sleep states, then cycler 20 is set so that in subsequent treatments, the patient dwells are adjusted so that the patient drains/patient fills occur during deep sleep states.

System 10d additionally incudes delaying an alarm or alert until the patient reaches a lighter sleep state, e.g., Sleep 2, Sleep 1 or REM, as illustrated above in connection with FIG. 9. Certain alarm or alert events are important for the patient to see and/or hear, e.g., at user interface 58 of cycler 20, and are therefore important enough to wake the patient. System 10d in one embodiment however waits for the patient to come out of a deep sleep state e.g., Sleep 4 in FIG. 9, before alarming. To this end, it is contemplated for system 10d to prioritize alarm or alert events into multiple categories, such as alarm events that need to be provided immediately, alarm or alert events that may be put off until the patient comes out of deep sleep state, and alarm or alert events that may be saved and provided at the end of treatment. An example of an alarm event that needs to be provided immediately is a leak detection alarm in which PD fluid may be leaking within cycler 20. An example of an alarm or alert event that can be delayed until the patient comes out of deep sleep state may be a partial occlusion in which PD fluid is flowing but perhaps not as efficiently as possible. An example of an alarm or alert event that can be delayed until the end of treatment may be a machine alarm, such as an operational pressure alarm, which is not connected to treatment, but which may indicate that cycler 20 will need maintenance in the near future.

It is contemplated for system 10d, if forced to provide an alarm or alert while the patient is in a deep sleep state to begin at a low level, e.g., low audio level, and increase as the patient enters lighter sleep states, e.g., in FIG. 9 start at a low volume level in Sleep 4, increase volume in Sleep 3, increase volume further in Sleep 2 and be provided in full in Sleep 1 and REM. In this manner, system 10d gently wakes the patient.

System 10d includes many of the same components as system 10c. In particular, FIG. 10 illustrates that system 10d includes one or more sensor(s) located either at PD machine or cycler 20, on the patient (e.g., a wearable sensor 68 such as a watch or a ring), or on a peripheral device such as the patient's smart device 116, which records physiological signals correlated to the patient's sleep state.

The sensor(s) at cycler 20 may for example include a camera that records the patient, a blood pressure cuff that may be pressurized via pneumatic pressure used for actuating the pump and valve chambers of disposable cassette 122 (FIG. 1), and/or a microphone 48. Control unit 50 (FIG. 1) of cycler 20 may be programmed to monitor the camera feed for patient movement and/or to intermittently take the patient's blood pressure reading. The output of microphone 48 may be used to detect snoring sounds and sounds associated with sleep disturbance, e.g., patient movement sounds. The sensor(s) at wearable sensor 68 may sense for any one or more of blood pressure, heart rate, respiratory rate, oxygenation level, temperature, movement and combinations of same. The sensor(s) at the patient's smart device 116 may also include a motion sensor and/or a microphone. Any of the microphones discussed herein may be used to determine the sleep state of the patient.

It is also contemplated for system 10d to incorporate the learning or artificial intelligence ("AI") aspect of sleep system 10c, which involves the use of sensed data to learn the patient's sleeping patterns and sleep states (e.g., deep sleep, lighter sleep, REM, and awake). After the patient's sleep patterns have been learned, control unit 50 of PD machine or cycler 20 may be modified as to (i) how PD fluid pumping (filling or draining) takes place at disposable cassette 122 (FIG. 1), and (ii) how alarms and alerts are delivered, e.g., at user interface 58. The sensed sleep data may also be transferred to a doctor's or clinician's digital support platform, e.g., at network 100, doctor/clinician's server 110, doctor/clinician's computer 112 and/or doctor/clinician's smart device 115. Here, the data is analyzed to determine if and how a patient's treatment prescription may be modified to minimize sleep disruption, while still providing the required fluid removal and solute clearance.

FIG. 11 illustrates the alarm or alert algorithm or methodology of system 10d. FIG. 11 is a hypnogram and may be displayed as it occurs in real time on patient's smart device 116 as illustrated in FIG. 10. The Y-axis of FIG. 11 shows sleep states "Awake", "Sleep" and "Deep Sleep". Sleep state "Awake" in FIG. 11 is analogous to sleep state "awake" in FIG. 9. Sleep state "Sleep" in FIG. 11 is analogous to sleep states Sleep 1 to Sleep 3 in FIG. 9. Sleep state "Deep Sleep" in FIG. 11 is analogous to sleep state Sleep 4 in FIG. 9. The X-axis of FIG. 10 shows time in hours over the course of treatment, with treatment beginning at time 00 and treatment ending just after six hours.

FIG. 11 illustrates that system 10d in one embodiment delays the beginning of treatment until time 00, when the patient has reached the Deep Sleep state. Here, assuming the patient is full of effluent from a prior PD fluid exchange, cycler 20 performs an initial drain on the patient followed immediately by a patient fill. If the patient is instead initially dry, cycler 20 performs an initial patient fill. In either case, noise produced by the pump and valve actuation within cycler 20 for the patient drain (if provided) and patient fill occurs while the patient is in the Deep Sleep state and therefore likely does not wake the patient.

System 10d is configured to let the initial patient fill volume of PD fluid dwell within the patient until the next patient Deep Sleep state, which occurs at time t2 of about 01.3 hours. Here, cycler 20 performs a second patient drain (or initial patient drain), followed immediately by a second patient fill. System 10d is then configured to let the second patient fill volume of PD fluid dwell within the patient until the next patient Deep Sleep state, which occurs at time t3 of about 03.25 hours. Here, cycler 20 performs a third patient drain (or second patient drain), followed immediately by a third patient fill. System 10d is then configured to let the third patient fill volume of PD fluid dwell within the patient until the next patient Deep Sleep state, which occurs at time t4 of about 04.75 hours. Here, cycler 20 performs a fourth patient drain (or third patient drain), followed immediately by a fourth patient fill. System 10d is then configured to let the fourth patient fill volume of PD fluid dwell within the patient until the end of treatment when the patient is awakened at time t5 of about 06.1 hours. Here, cycler 20 performs a final patient drain, which may or may not be followed immediately by a final patient fill, e.g., of icodextrin. In each of the above patient drains and patient fills, noise produced by the pump and valve actuation within cycler 20 occurs while the patient is in the Deep Sleep state (or has awakened) and therefore likely does not wake the patient.

If a serious alarm event occurs while the patient is in any of the Deep Sleep states discussed above (00, t2, t3, t4), system 10d in an embodiment provides an audio alarm initially at a low level at user interface 58. When wearable sensor 68, microphone 48 and/or camera of cycler 20, and/or patient smart device 116 detects that the patient has moved to the lighter Sleep state in FIG. 11, control unit 50 of cycler 20 causes the audio alarm volume to be raised. The audio or alarm volume may be raised multiple times as the patient moves upwardly through the lighter Sleep state of FIG. 11. When wearable sensor 68, microphone 48 and/or camera of cycler 20, and/or patient smart device 116 detects that the patient has moved to the Awake state in FIG. 11, control unit 50 of cycler 20 causes the full audio alarm volume to be sounded, e.g., at user interface 58. User interface 58 may also display a visual alarm at any time during the rising or escalating audio alarm, which may explain the type of alarm event and any remedy to it.

Control unit 50 is in one embodiment programmed to categorize or to know a category for each alarm event. The categories may include two or more categories, such as three categories, including a critical or serious (first level) category, an intermediate (second level) category, and a non-threatening (third level) category. Control unit 50 is programmed in one embodiment to (i) provide an alarm for a critical or serious (first level) category alarm event immediately regardless of the patient's sleep state (perhaps using the escalating audio output discussed above if the patient is in Deep Sleep state); (ii) provide an alarm for an intermediate (second level) category alarm event immediately if the patient is in a lighter state (e.g., REM or Sleep 1 of FIG. 9) of the Sleep state of FIG. 11 or is awake, or wait until the patient is in in a lighter state (e.g., REM or Sleep 1 of FIG. 9) of the Sleep state of FIG. 11 if the patient is currently in a Deep Sleep state or currently in a deeper state (e.g., Sleep 1 or Sleep 2 of FIG. 9) of the Sleep state of FIG. 11; and (iii) provide an alarm for a non-threatening (third level) category alarm event immediately if the patient is awake or wait until the patient reaches the Awake state in FIG. 11 if currently in a deeper sleep state.

FIG. 11 illustrates that an example intermediate (second level) category alarm event occurs at time ae1 (about 03.4 hours) when the patient is in the Deep Sleep state. Such event as discussed above may be a partial occlusion during a patient drain or fill in which PD fluid is flowing but perhaps not as efficiently as possible. Control unit 50 of cycler 20 knows or determines that alarm event at time ae1 is an intermediate (second level) category alarm event and is programmed accordingly to delay the provision of the audio alarm or alert at user interface 58 until a time a1 (about 04.1 hours) occurring after the patient has come out of the Deep Sleep state. In the illustrated embodiment, control unit 50 monitors the output of wearable sensor 68, microphone 48 and/or camera of cycler 20, and/or patient smart device 116 in an attempt to let the patient enter as light a sleep state as possible before sounding the alarm or alert. Here, control unit 50 may monitor the slope or moving average slope of the output. When the slope or moving average of the slope indicates that the patient is beginning to drift back into a deeper sleep state, control unit 50 causes the audio alarm or alert to be provided at user interface 58 and at time a1.

It should be appreciated that a visual portion of the alarm associated with the alarm event occurring at time ae1 may be provided at user interface 58 any time after time ae1 because it will not disturb the patient's sleep. The visual portion of the alarm provided at user interface 58 instructs the patient awakened at time a1 as to the nature of the alarm event and any possible remedy, e.g., checking the patient line and solutions lines for possible partial occlusion.

FIG. 11 also illustrates that example non-threatening (third level) category alarm events occur at times ae2 (about 04.7 hours) and ae3 (about 05.6 hours) when the patient is asleep in either the Deep Sleep state (time ae2) or lighter Sleep state (time ae3). Such events as discussed above may be non-treatment events such as internal pressure alarms or perhaps an over- or under-temperature alarm that may be more appropriate for a maintenance log than for the patient. Control unit 50 of cycler 20 knows or determines that the alarm event is a non-threatening (third level) category alarm event and is programmed accordingly to delay the provision of the audio alarms or alerts at user interface 58 until times a2 and a3 (about 06.3 hours) occurring at or after the end of treatment and after the patient has awakened. Control unit 50 knows when treatment has ended by knowing when a final treatment action has been completed, such as a final patient fill or drain.

Control unit 50 of cycler 20 may be programmed to respond according to a patient preference after the final treatment action has been completed. For example, the patient may prefer to be gently audibly awakened at the end of treatment by user interface 58 to view any non-threatening (third level) alarm events, in which case control unit 50 may be programmed to provide the escalating audio alarm discussed above. In another example, the patient may prefer to wait until awaking naturally or by an external clock alarm to view any non-threatening (third level) alarm events. Here, control unit 50 is programmed to monitor the output of wearable sensor 68, microphone 48 and/or camera of cycler 20, and/or patient smart device 116 to know when the patient has reached the Awake state in FIG. 11 to cause the audio alarm or alert to be provided at user interface 58 and at times a2 and a3. As before, the visual component or portion of the alarm associated with the alarm event occurring at times ae2 and ae3 may be provided at user interface 58 any time after ae2 and ae3, respectively, because they will not disturb the patient's sleep.

It should be understood that various changes and modifications to the presently preferred embodiments described herein will be apparent to those skilled in the art. It is therefore intended that such changes and modifications be covered by the appended claims. For example, wherever the specification discloses a combined microphone and motion detection wearable sensor, two separate wearable sensors, one for sound detection and one for motion detection may be provided instead. Also, while cycler 20 is described as operating using pneumatic pumping and a disposable cassette 120, cycler 20 may alternatively employ peristaltic pumping or have durable components, such as durable electromechanical pumps and valves, which may be disinfected between treatments to ensure safe treatments for the patient.

The invention is claimed as follows:

1. A peritoneal dialysis ("PD") system comprising:
    at least one sensor configured to detect a sleep state of a patient;
    a PD fluid pump positioned and arranged to pump fresh PD fluid to the patient and remove used PD fluid from the patient; and
    a control unit for controlling the PD fluid pump, the control unit configured to delay an audio alarm for an alarm event until the sleep state of the patient transitions from a deep sleep state to a lighter sleep state, the control unit configured to provide the audio alarm during the lighter sleep state to wake the patient;
    wherein the alarm event is an intermediate alarm event, the PD system further including a critical alarm event, and wherein the control unit is configured to provide an audio alarm for the critical alarm event during the deep sleep state if the critical alarm event occurs during the deep sleep state.

2. The PD system of claim 1, wherein the control unit is further configured to provide a visual alarm for the alarm event at any time after the alarm event occurs.

3. The PD system of claim 1, wherein the control unit is further configured to begin a patient drain followed by a patient fill when the at least one sensor indicates that the patient is in the deep sleep state.

4. The PD system of claim 1, wherein the audio alarm for the critical alarm event is an escalating audio alarm.

5. The PD system of claim 1, wherein the control unit is configured to provide the audio alarm for the intermediate alarm event upon occurrence of the intermediate alarm event if the intermediate alarm event occurs in the lighter sleep state.

6. The PD system of claim 1, wherein the control unit is configured to provide a visual alarm for the critical alarm event after the critical alarm event occurs.

7. The PD system of claim 1, wherein the alarm event is an intermediate alarm event, the system further including a non-threatening alarm event, and wherein the control unit is configured to provide an audio alarm for the non-threatening alarm event after the patient has awakened.

8. The PD system of claim 7, wherein the control unit is configured to provide the audio alarm for the non-threatening alarm event after treatment has ended.

9. The PD system of claim 1, wherein the at least one sensor includes a wearable sensor.

10. The PD system of claim 1, wherein the at least one sensor is provided by a PD machine, the PD machine including the PD fluid pump and the control unit.

11. The PD system of claim 1, wherein the at least one sensor is provided by a patient smart device.

12. The PD system of claim 1, wherein the at least one sensor includes at least one of a blood pressure sensor, a heart rate sensor, a respiratory rate sensor, an oxygen level sensor, a temperature sensor, a movement sensor and combinations of same.

13. A peritoneal dialysis ("PD") system comprising:
    at least one sensor configured to detect a sleep state of a patient;
    a PD fluid pump positioned and arranged to pump fresh PD fluid to the patient and remove used PD fluid from the patient; and
    a control unit for controlling the PD fluid pump, the control unit configured to categorize or know a category of an alarm event including a first level alarm event, a second level alarm event and a third level alarm event, and wherein the control unit is further configured to (i) provide an audio alarm for the first level alarm event during a deep sleep state if the first level alarm event occurs during the deep sleep state, (ii) provide an audio alarm for the second level alarm event during a lighter sleep state if the second level alarm event occurs during the deep sleep state, and (iii) provide an audio alarm for the third level alarm event after the patient has awakened.

14. The PD system of claim 13, wherein the audio alarm for the first level alarm event is an escalating audio alarm.

15. The PD system of claim 13, where the control unit is configured in to provide the audio alarm for the first level alarm event upon occurrence of the first level alarm event regardless of which sleep state the first level alarm event occurs.

16. The PD system of claim 13, wherein the control unit is configured to provide the audio alarm for the third level alarm event after the patient has awakened regardless of which sleep state the third level alarm event occurs.

* * * * *